(12) United States Patent
Sugimoto et al.

(10) Patent No.: US 7,895,161 B2
(45) Date of Patent: Feb. 22, 2011

(54) STORAGE SYSTEM AND METHOD OF MANAGING DATA USING SAME

(75) Inventors: Yuki Sugimoto, Sagamihara (JP); Takuya Okamoto, Machida (JP)

(73) Assignee: Hitachi, Ltd., Tokyo (JP)

( * ) Notice: Subject to any disclaimer, the term of this patent is extended or adjusted under 35 U.S.C. 154(b) by 408 days.

(21) Appl. No.: 11/969,414

(22) Filed: Jan. 4, 2008

(65) Prior Publication Data

US 2008/0301201 A1 Dec. 4, 2008

(30) Foreign Application Priority Data

May 29, 2007 (JP) ............................. 2007-142491

(51) Int. Cl.
*G06F 7/00* (2006.01)
(52) U.S. Cl. ...................... 707/640; 707/644; 707/645; 707/646; 707/651; 709/224; 711/162
(58) Field of Classification Search ......... 707/600–831; 709/224; 711/162
See application file for complete search history.

(56) References Cited

U.S. PATENT DOCUMENTS 7,085,904 B2 8/2006 Mizuno et al.
7,472,242 B1 * 12/2008 Deshmukh et al. .......... 711/162
2005/0086443 A1 * 4/2005 Mizuno et al. .............. 711/162

FOREIGN PATENT DOCUMENTS

JP 2004-259045 9/2004
JP 2005-122611 5/2005

* cited by examiner

*Primary Examiner*—Don Wong
*Assistant Examiner*—Tuan-Khanh Phan
(74) *Attorney, Agent, or Firm*—Antonelli, Terry, Stout & Kraus, LLP.

(57) ABSTRACT

The storage system includes a file server connected to a host apparatus and configured to provide a directory in a file system having a directory structure to the host apparatus, a storage subsystem connected to the file server and configured to provide a volume for storing the file system, and a management apparatus connected respectively to the file server and the storage subsystem and configured to manage backup/restoration of an arbitrary directory contained in the file system. The storage system selects one of backup methods of a directory designated as a backup target by the management apparatus, and executes backup processing to the designated directory. The storage system also includes a restoration controller configured to control execution of restoration processing to backup data based on the backup processing.

14 Claims, 20 Drawing Sheets

| DIRECTORY | VOLUME |
|---|---|
| dir0 (/) | /dev/vol0 |
| /dir1 | /dev/vol0 |
| /dir0/dir2 | /dev/vol0 |
| /dir0/dir3 | /dev/vol0 |
| /dir0/dir3/dir4 | /dev/vol1; /dev/vol2 |
| : | : |

| VOLUME NAME | /dev/vol1 | /dev/vol2 | /dev/vol2 | ... |
|---|---|---|---|---|
| TOTAL CAPACITY | 50GB | 100GB | 10GB | ... |
| UTILIZATION | 40% | 10% | 90% | ... |
| NUMBER OF FILES | 3 | 1 | 2 | ... |
| FILE CAPACITY | File11 : 10GB | File21 : 10GB | File31 : 5GB | ... |
| | File12 : 5GB | - | File32 : 4GB | ... |
| | File13 : 5GB | - | - | ... |
| | - | - | - | ... |

FIG.9

| DIRECTORY PATH | HIERARCHY | NUMBER OF FILE SYSTEMS | UTILIZATION (%) | STATUS OF SUBORDINATE DIRECTORY | NUMBER OF FILES |
|---|---|---|---|---|---|
| /mnt/dir0/dir1 | 1 | 1 | 10 | YES | 10 |
| /mnt/dir0/dir2 | 1 | 1 | 5 | YES | 20 |
| /mnt/dir0/dir3 | 1 | 2 | 1 | NO | 30 |
| : | : | : | : | : | : |

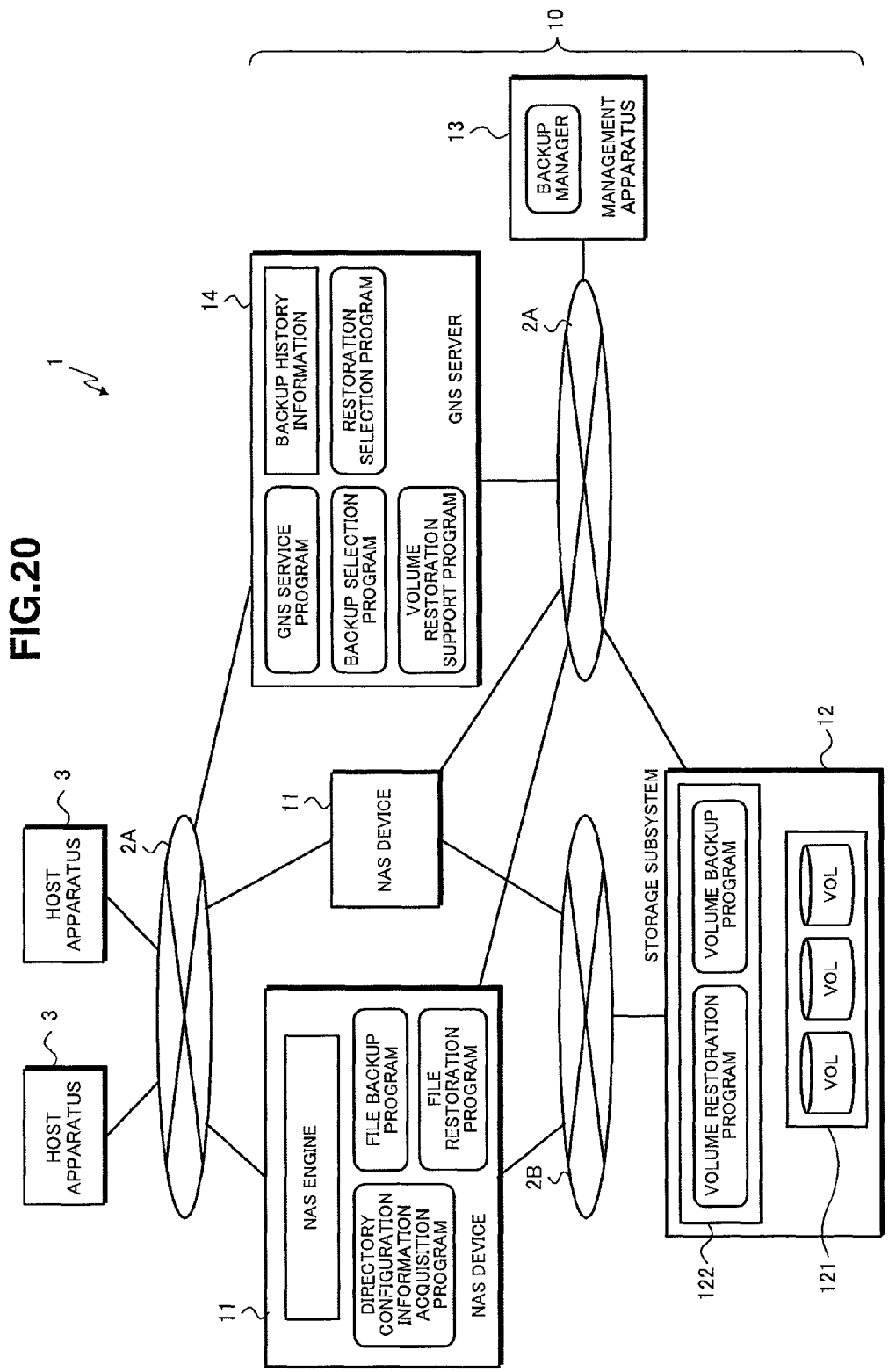

STORAGE SYSTEM AND METHOD OF MANAGING DATA USING SAME

CROSS REFERENCES

This application relates to and claims priority from Japanese Patent Application No. 2007-142491, filed on May 29, 2007, the entire disclosure of which is incorporated herein by reference.

BACKGROUND

1. Technical Field

The present invention generally relates to a storage system and a data management method executed in this storage system, and particularly relates to backup/restore technology of data in a SAN/NAS integrated storage system.

2. Description of the Related Art

In a computer system, it is standard to back up data stored in a storage subsystem periodically or irregularly so that data can be restored immediately even when such data is lost due to a failure in the storage subsystem or the like.

From the perspective of temporal transition of volumes storing data, the backup of such data may be classified into a full backup method of backing up the entire data as the backup target, and a differential backup method of backing up the updated (differential) portion with the fully backed up data as the origin.

Japanese Patent Laid-Open Publication No. 2005-122611 discloses technology of selecting the optimized backup method; that is, either the full backup method or the differential backup method, in which the recovery of data within the target recovery time designated by the user is expected to be possible based on the restoration performance of a backup target volume and the update quantity of data in such volume.

Further, from the perspective of data structure, backup may be classified into a file backup method and a volume backup method. With the file backup method, for instance, backup is performed in directory/file units configuring a file system managed by NAS (Network Attached Storage). In contrast, with the volume backup method, for instance, backup is performed in volume (logical device) units configured in a storage subsystem. Because the volume backup method copies the binary data of the volume itself by using the implemented function in the storage subsystem, there is an advantage in the execution performance in that the backup processing is faster in comparison to the file backup method.

Further, with a typical SAN/NAS integrated storage system, the host apparatus accesses the storage resource (i.e., data) in a SAN-connected storage subsystem via a NAS apparatus (i.e., a file server). Thus, the file backup method is considered to be more compatible with the backup of data in the SAN/NAS integrated storage system because it is able to select the backup target in units of files.

Further, Japanese Patent Laid-Open Publication No. 2004-259045 discloses technology of backing up data in a tape device to which a NAS volume is SAN-connected in a SAN/NAS integrated storage apparatus.

With the file backup method, the user (system administrator) may selectively designate the backup target in file units. However, the NAS device needs to process the structural data concerning the file system during backup processing. Thus, the execution performance of the system becomes relatively low. Also, a CPU and/or network system gets overloaded.

With the volume backup method, although the execution performance is relatively high, the storage cost is high since a volume is used as the unit of a backup target.

Thus, for example, in a case when the directories of the backup target are consolidated into a single volume, there are cases where the execution performance would be higher by selecting the volume backup method rather than selecting the file backup method. However, since it is difficult for the system administrator to recognize what kind of logical volumes are configuring the storage resource in the SAN/NAS integrated storage system, it is also difficult to select the appropriate backup method.

Moreover, in recent years, a SAN-connected storage subsystem is mounted with various sophisticated copy functions such as remote copy, journaling, and snapshot. However, even if this kind of SAN-connected storage system is incorporated into a SAN/NAS integrated storage system, there is a problem in that these sophisticated copy functions cannot be effectively utilized.

SUMMARY

An object of the present invention is to enhance the efficiency of backup/recovery processing by giving consideration to the balance between the effective performance of backup/recovery processing and the storage cost in the storage system.

More specifically, an object of the present invention is to enable the storage system to select the optimal backup method for backing up a directory designated as the backup target.

Another object of the present invention is to enable the presentation of the selected backup method to the system administrator.

Further, another object of the present invention is to enable the backup processing to be executed according to the selected backup method.

Furthermore, another object of the present invention is to enable the recovery of backup data based on the backup processing executed according to the selected backup method.

In order to achieve the foregoing objects, the present invention provides the following subject matter sought to be patented.

The present invention provides a storage system and a data management method in such a storage system that acquires directory configuration information concerning a directory designated as a backup target, and executes backup processing according to an optimal backup method to the designated directory based on the acquired directory configuration information.

Specifically, According to an aspect of the present invention, the present invention provides a storage system comprising a file server operatively connected to a host apparatus and configured to provide a directory in at least one file system having a directory structure to the host apparatus, a storage subsystem operatively connected to the file server and configured to provide at least one volume for storing the at least one file system, and a management apparatus operatively connected respectively to the file server and the storage subsystem and configured to manage backup/restoration of an arbitrary directory contained in the at least one file system. The storage system comprises a backup controller configured to select one of prescribed backup methods to a directory designated as a backup target by the management apparatus based on directory configuration information of a file system regarding the designated directory, and to execute backup processing to the designated directory according to the selected backup method.

Further, according to another aspect of the present invention, the present invention provides a storage system comprising a file server operatively connected to a host apparatus and configured to provide a directory in at least one file system having a directory structure to the host apparatus, a storage subsystem operatively connected to the file server and configured to provide at least one volume for storing the at least one file system, and a management apparatus operatively connected respectively to the file server and the storage subsystem and configured to manage backup/restoration of an arbitrary directory contained in the at least one file system. The file server selects one of prescribed backup methods to a directory designated as a backup target by the management apparatus based on directory configuration information of a file system regarding the designated directory, and sends the selected prescribed backup method to the management apparatus. The management apparatus provides the selected backup method to a user, and causes either the file server or the storage subsystem to execute backup processing based on an execution command from the user.

Moreover, according to another aspect of the present invention, the present invention provides a method of managing data in a storage apparatus including a file server that provides at least one file system having a directory structure in a volume formed in a storage subsystem to a host apparatus. This data management method comprises receiving, under control of a management apparatus, a designation of a directory to become a backup target in the at least one file system, acquiring, under control of a backup controller, directory configuration information of a file system concerning the designated directory, selecting, under control of the backup controller, one of prescribed backup methods based on the acquired directory configuration information, and executing, under control of the backup controller, backup processing to the designated directory according to the selected backup method.

According to the present invention, it is possible to efficiently back up the data stored in the storage subsystem.

In particular, according to the present invention, efficient backup processing is executed since either the file backup method or the volume backup method is selected according to the directory configuration information of the directory as the backup target upon backing up the directory/file in a SAN/NAS integrated storage system.

DESCRIPTION OF DRAWINGS

FIG. 9 is a diagram explaining an exemplary directory configuration information according to an embodiment of the present invention;

FIG. 20 is a diagram showing a configuration of a computer system according to another embodiment of the present invention.

DETAILED DESCRIPTION

Embodiments of the present invention are now explained with reference to the attached drawings.

Figure 1:
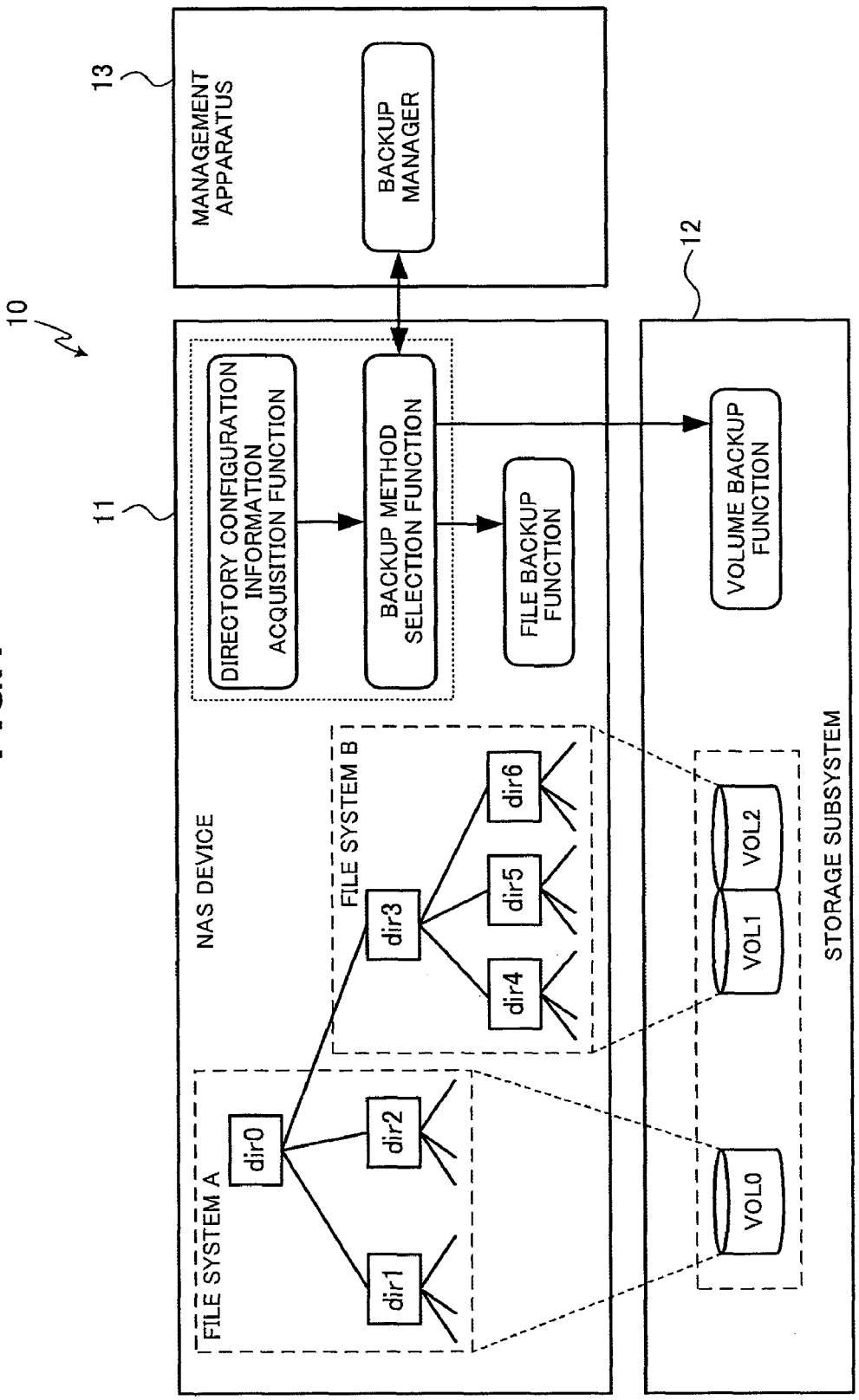
FIG. 1 is a conceptual diagram explaining a data backup/restoration mechanism according to the present invention.

FIG. 1 is a conceptual diagram explaining a data backup/restoration mechanism according to the present invention. It will be apparent to one skilled in the art that backup and restoration are of a complementary relationship, and as used herein, the term "backup" may include "restoration" unless otherwise stated.

As shown in FIG. 1, a storage system 10 according to the present invention is configured by combining a NAS device 11 and a storage subsystem 12. The NAS device 11 and the storage subsystem 12, for instance, are connected via a SAN. The storage system 10 also comprises a management apparatus 13.

Although the NAS device 11 is generally a file server itself, as referred to herein, it shall be a server mounted with a dedicated OS specializing in file services. The NAS device 11 is typically mounted with a file backup function. The file backup function is a function for backing up data in shared directory/file units. Further, the NAS device 11 of this embodiment, as described later, is configured to provide the optimal backup method to a system administrator using the management apparatus 13.

The storage subsystem 12 is configured to include a disk array device as a physical storage device. The storage subsystem 12 provides a logical volume or a logical unit (hereinafter referred to as a "volume") formed in the disk array device to the NAS device 11. In other words, a volume is a logical storage device to be recognized by the NAS device 11. The storage subsystem 12 is typically mounted with a volume backup function. The volume backup function is a function for backing up data in volume units.

Let it be assumed that the NAS device 11 currently contains file systems A and B. The file system A has a directory structure containing "dir0" as a root directory, and dir1 and dir2 formed as lower directories thereunder. Further, the file system B has a directory structure having "dir3" mounted on the root directory "dir0" as its highest-level layer, and "dir4" to "dir6" formed as lower directories thereunder.

Further, the storage subsystem 12 has volumes VOL0 to VOL2 formed therein. The overall file system A is formed in the volume VOL0, and the overall file system B is formed in the volumes VOL1 and VOL2.

With the storage system 10 having this kind of physical/logical configuration, when backing up the overall file system A, it is apparent that the volume VOL0 can be backed up using the volume backup function of the storage subsystem 12. Likewise, the volume backup function may also be used when backing up the overall file system B. In general, since the volume backup method is more advantageous in terms of effective performance in comparison to the file backup method, in the foregoing case, a more efficient backup can be expected by using the volume backup method.

In contrast, for instance, when backing up "dir6" of the file system B, using the volume backup function would be inefficient from the perspective of storage costs. Therefore, in the foregoing case, the file backup function of the NAS device 11 is used to backup "dir7."

Thus, the storage system 10 selects the optimal backup method to a directory as the backup target, and provides the selected method to the system administrator operating the management apparatus 13. The system administrator confirms the selected backup method via the management apparatus 13, and thereby the storage system 10 executes backup processing according to the selected backup method.

Figure 2:
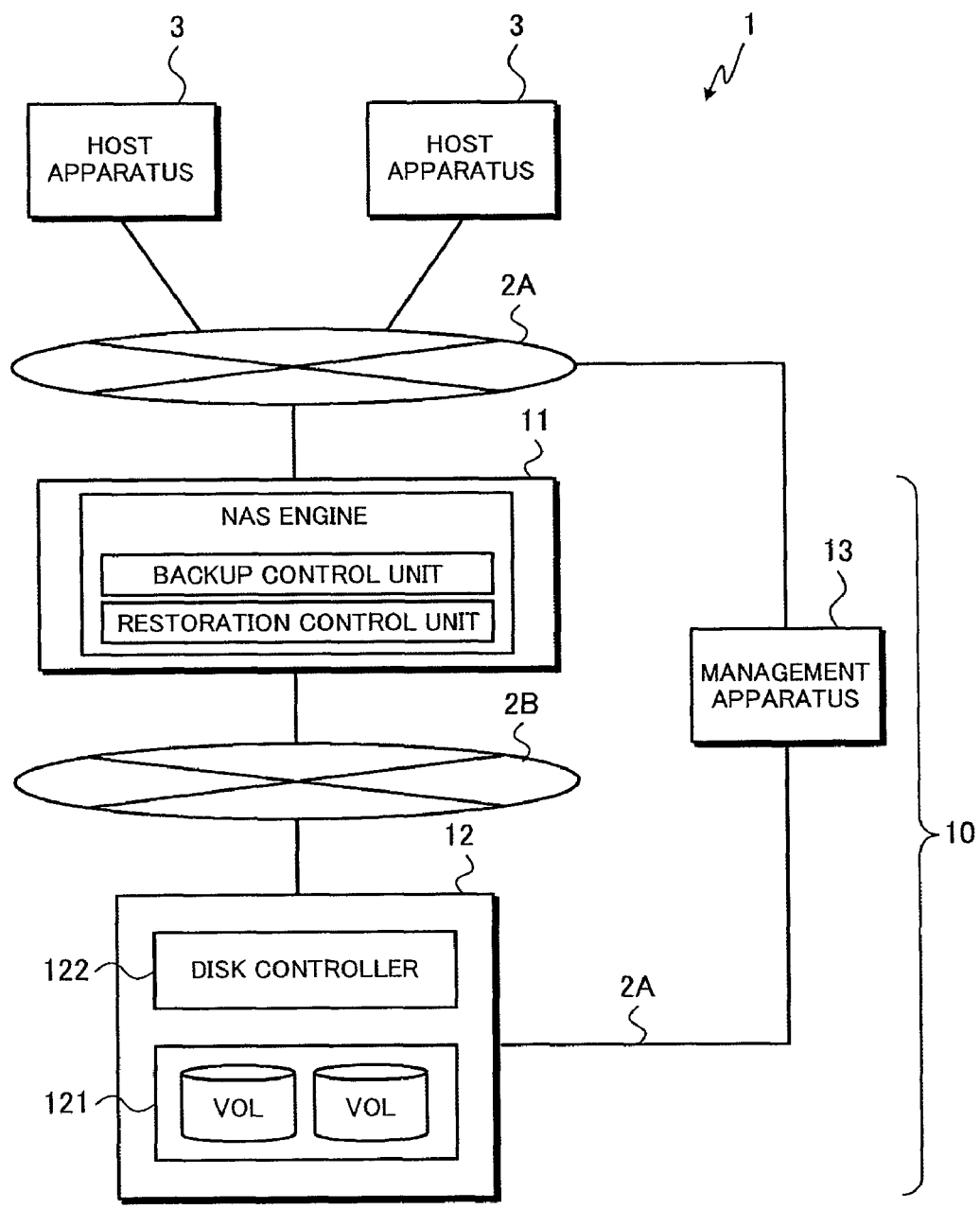
FIG. 2 is a diagram showing a schematic configuration of a computer system according to the present invention.

FIG. 2 shows a schematic configuration of a computer system according to an embodiment according to the present invention. As shown in FIG. 2, the computer system 1 comprises one or more NAS devices 11 connected to a host apparatus 3 via a network 2A, and a storage subsystem 12 connected to the NAS device 11 via a network 2B. In other words, the storage system 10 is connected to the host apparatus 3 via the network 2A, and the host apparatus 3 accesses the volume VOL under the control of the NAS device 11. The computer system 1 also comprises a management apparatus 13 respectively connected to the NAS device 11 and the storage subsystem 12.

The network 2A, for instance, is a LAN or the Internet. Further, the network 2B, for instance, is a SAN. In this embodiment, the network 2A is configured from a LAN based on a TCP/IP protocol, and the network 2B is configured from a SAN (FC-SAN) based on a fibre channel protocol.

The host apparatus 3, for example, is a core computer in a business system of banks or a seat reservation business system of airline companies. Specifically, the host apparatus 3 comprises hardware resources such as a processor, a memory, a communication interface, a local I/O device and the like, and also comprises software resources such as a device driver, an operating system (OS), an application program and the like (not shown). By way of this, the host apparatus 3 executes various programs under the control of the processor, and realizes desired processing based on the cooperative effect with the hardware resources. For example, the host apparatus 3 accesses the storage system 10 and realizes a desired business system by executing business application programs based on the OS and under the control of the processor.

The NAS device 11 includes a NAS engine, and thereby performs a file service. The NAS engine is a sort of virtual machine that is various control programs such as OS and file service programs to be executed under the control of the processor. The NAS engine of this embodiment includes a backup control function of selecting the optimal backup method for the system administrator operating the management apparatus 13 and controlling the execution thereof, and a restoration control function of controlling the restoration of the backed up data.

The storage subsystem 12 comprises a disk array device 121 as a physical device (PDEV), and a disk controller 122 for controlling the I/O access such as writing into and reading from the disk array device 121.

The management apparatus 13 is typically a general-purpose computer, connected to the NAS device 11 and the storage subsystem 12, and used by the system administrator to manage these components. In other words, the system administrator manages the storage system 10 by operating various management programs to be executed by the management apparatus 13. In this embodiment, when the management apparatus 13 executes the backup manager, thereby allowing the system administrator to perform backup with the optimal backup method.

Figure 3:
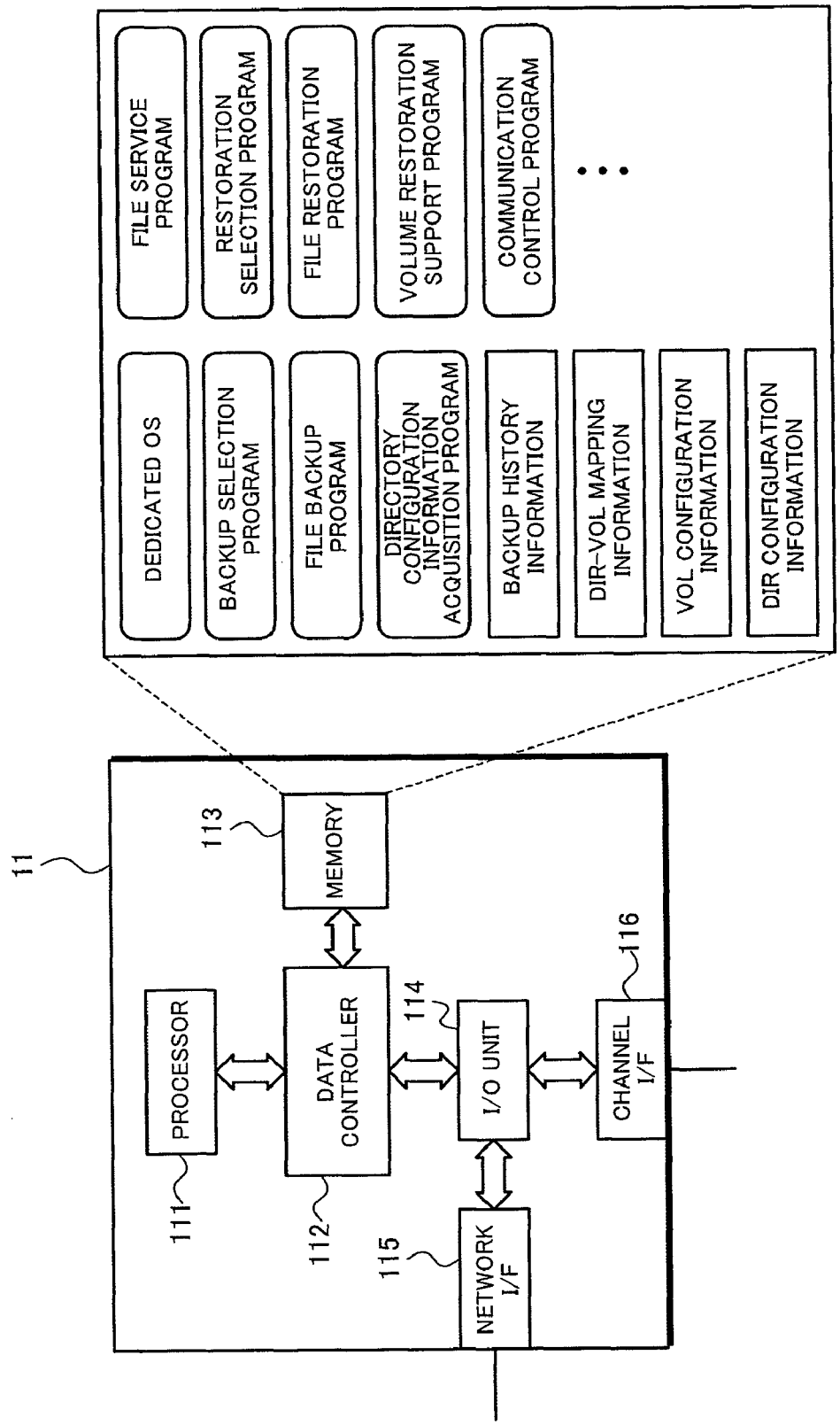
FIG. 3 is a diagram explaining a configuration of a NAS device according to an embodiment of the present invention.

FIG. 3 is a diagram explaining the configuration of the NAS device 11 according to an embodiment of the present invention. As shown in FIG. 3, the NAS device 11 comprises a processor 111, a data controller 112, a memory 113, an I/O unit 114, a network interface (I/F) 115, and a channel I/F 116.

The processor 111 governs the overall operation of the NAS device 11, and executes various programs stored in the memory 113 to cause the NAS device 11 to function as a NAS engine. The processor 111 and the memory 113 are configured to exchange internal data via the data controller 112.

Specifically, as described above, the basic function of the NAS device 11 is to behave as a file server, and, therefore, the processor 111 executes the file service program on a dedicated OS. Further, the NAS device 11 of this embodiment is mounted with a backup control function. Thus, the memory 113 stores a backup selection program, a file backup program, a directory configuration information acquisition program, a restoration selection program, a file restoration program, a volume restoration support program and the like, and the processor 111 executes these programs. Moreover, the memory 113 stores various types of information to be referred to by these programs; namely, backup history information 500, directory-volume mapping information 600, volume configuration information 700, directory configuration information 800 and the like.

The I/O unit 114 is a circuit that governs the I/O control, and connects the network I/F 115 and the channel I/F 116. The I/O unit 114 may also be connected to an extended I/F for connecting to another external board.

The network I/F 115 has a port not shown, and is a system circuit that functions as an interface for controlling the communication based on a file access request with the host apparatus 3 connected via the network 2A. The network I/F 115 also has a port for connecting the management apparatus 113, and controls the communication with the management apparatus 13.

The channel I/F 116 has a port (not shown), and is a system circuit that functions as an interface for controlling the communication based on an I/O access request with the storage subsystem 12 connected via the network 2B.

Figure 4:
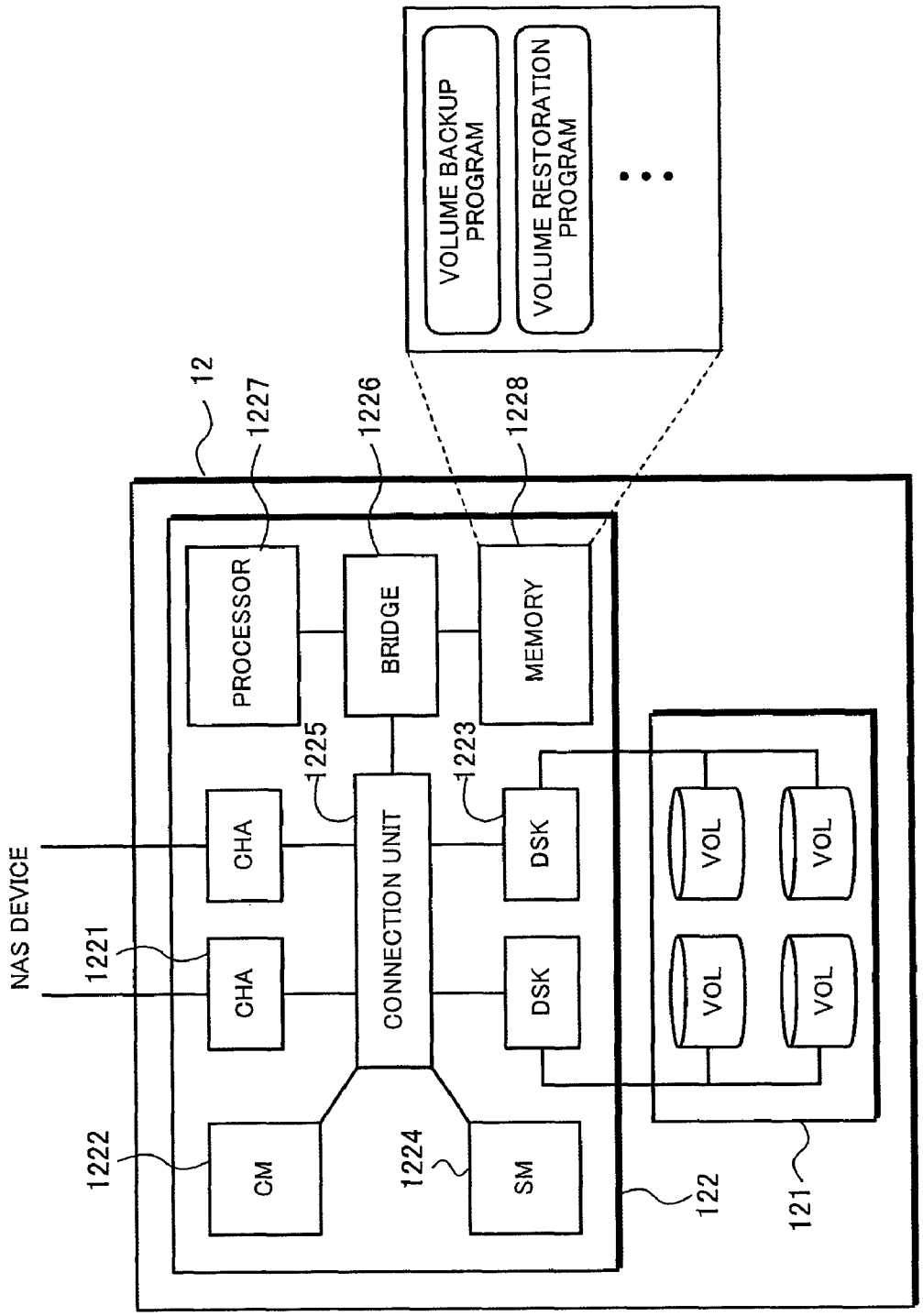
FIG. 4 is a diagram explaining a configuration of a storage subsystem according to an embodiment of the present invention.

FIG. 4 is a diagram explaining the configuration of the storage subsystem 12 according to an embodiment of the present invention. The storage subsystem 12 is a device for providing disk space to the host apparatus 3, and, as described above, comprises a disk array device 121, and a disk controller 122 for controlling the disk array device 121.

The disk array device 121, for example, is configured by including a storage medium such as hard disk drive, a disk array, a nonvolatile memory or the like. The disk array device 121 may configure a RAID (Redundant Arrays of Independence Disks). In a RAID configuration, a certain number of disk arrays configure one virtual device (VDEV), and one or more logical devices (LDEV) are defined in the virtual device. A logical device is a logical device to be recognized by the NAS engine.

A volume (VOL) is defined in a logical device. Here, in order to simplify the explanation, one volume is allocated to one logical device. A logical volume number is assigned to each volume. Further, a volume is partitioned into a block or a segment, which is the smallest unit of I/O access, and a logical block address is allocated to each block. Thereby, the NAS device 11 is able to access data stored in an arbitrary block of a specified volume by assigning a logical address formed from a logical volume number and a logical block address to the storage subsystem 12 based on a file access command from the host apparatus 3.

The disk controller 122 comprises a channel adapter (CHA) 1221, a cache memory (CM) 1222, a disk adapter (DKA) 1223, and a shared memory (SM) 1224, and these modules or components are mutually connected via a connection 1225. Moreover, the disk controller 122 comprises a processor 1227 and a memory 1228 connected via a bridge 1226. The processor 1227 executes various programs stored in the memory 1228.

In FIG. 4, although one of each of the modules is shown, by adopting a redundant configuration a plurality of modules may be used in the configuration.

The channel adapter 1221 has a plurality of ports (not shown), and is a system circuit that functions as a communication interface for performing communication based on an I/O access with the NAS device 11 connected to the port via the network 2B.

The cache memory 1222 temporarily stores data to be exchanged between the NAS device 3 and the disk array device 121 in order to provide a high system performance to the NAS device 11.

The disk adapter 1223 has a plurality of ports (not shown), and is a component or a system circuit that functions as an interface for controlling the I/O access to the disk array device 121. Specifically, the disk adapter 1223 retrieves data from the cache memory 1222 and stores it in a prescribed storage area (block) of a volume formed in the disk array device 121 (destaging), or reads data from a prescribed storage area of the volume VOL and writes it into the cache memory 422 (staging).

The shared memory 1224 is a memory to be referred to by the respective modules in the storage subsystem 12, and is configured from a RAM, a ROM, a nonvolatile RAM or the like.

The connection unit 1225 includes a switching device configured from a crossbar switch or the like. The connection 1225 arbitrates the competition of input data signals, switches the path of the data signals, and thereby establishes a path between the source module and the destination module.

The bridge 1226 is a circuit configured to connect the connection 1225 and the processor 1227. The processor 1227 executes various programs stored in the memory 1228, and governs operations (for instance, backup processing and the like) that are separated from the I/O service of the storage subsystem 12. In this embodiment, the memory 1228 stores a volume backup program 00 and a volume restoration program 00. Further, the memory 1228 may also retain a remote copy program, a snapshot program and the like.

Figure 5:
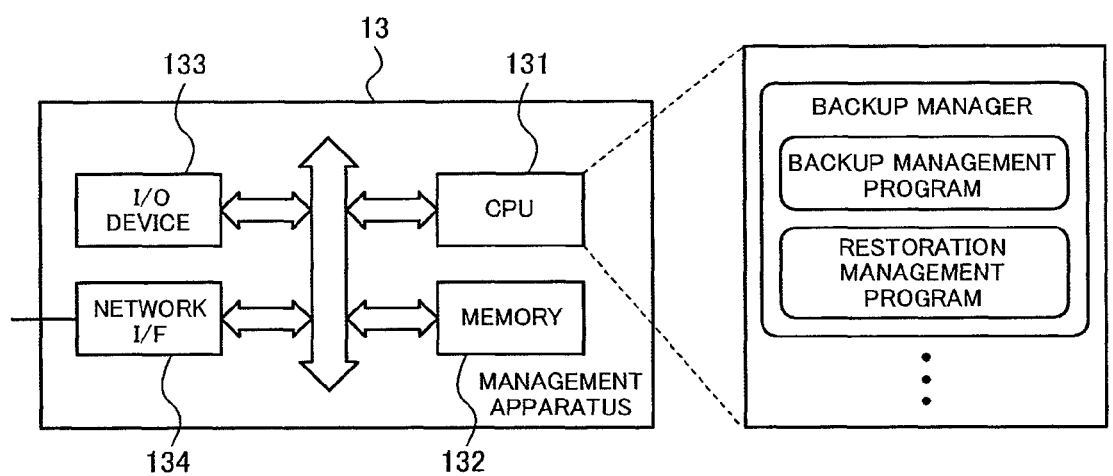
FIG. 5 is a diagram explaining a configuration of a management apparatus according to an embodiment of the present invention.

FIG. 5 is a diagram explaining the configuration of the management apparatus 13 according to an embodiment of the present invention. The management apparatus 13, as described above, is typically a general-purpose computer, and therefore comprises hardware resources such as a CPU 131, a memory 132, an I/O device 133, an I/F device 134 and the like, and software resources such as an OS, a management program and the like.

The CPU 131 executes the backup manager stored in the memory 132 and provides a backup tool to the system administrator. The backup manager of this embodiment communicates with the NAS device 11 and presents the optimal backup method to the system administrator. The I/O device 133, for example, is configured from a keyboard, a pointing device, a display and the like for providing a user interface environment to the system administrator. The I/F device 134 functions as an interface for controlling the communication with an external device; in other words, the NAS device 11. The management apparatus 13 is also connected to the storage subsystem 12 via the I/F device 134, and is able to directly manage the storage subsystem 12.

Figure 6:
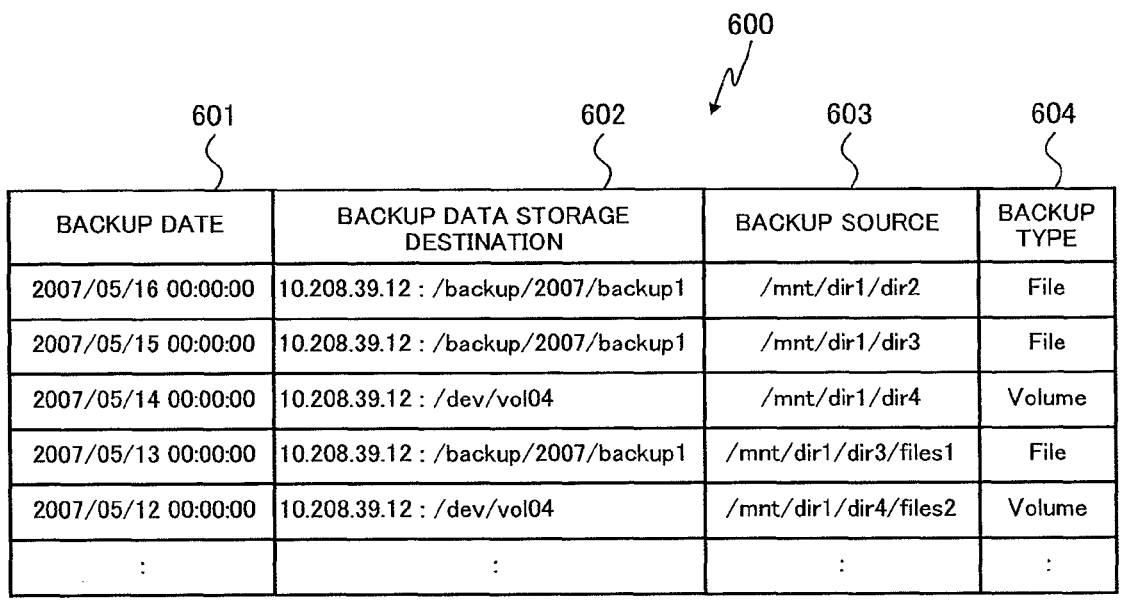
FIG. 6 is a diagram explaining an example of backup history information according to an embodiment of the present invention.

FIG. 6 is a diagram explaining an example of the backup history information 600 according to an embodiment of the present invention. The backup history information 600 is log data accumulated each time backup processing is executed. In this embodiment, the backup history information 600 is created based on the completion result from the file backup program in the NAS device 11 or the volume backup program in the storage subsystem 12 to which backup processing was executed by the backup selection program.

In other words, as shown in FIG. 6, the backup history information 600 includes a backup date column 601, a backup destination column 602, a backup source column 603, and a backup type column 604.

The backup date column 601 shows the time that the backup processing was completed. The backup destination column 602 shows the location where the backup data is stored, and is formed from a network identifier (i.e., an IP address) of another device operated to store the backup data and a file name (in the case of file backup processing) or a device file name (in the case of volume backup processing) in the other device. The other device, for example, is another NAS device 11 connected via the network 2A. Nevertheless, this does not prevent the backup data from being stored in the same NAS device 11. In this case, the IP address may be omitted.

The backup source column 603 shows a directory or a file that became the backup target. Namely, the storage system 10 of this embodiment supports backup processing in directory units or file units.

The backup type column 604 shows the type of backup method. In this embodiment, there are a file backup method and a volume backup method. Specifically, when "File" is indicated in the backup type column 604, this represents that file backup processing was executed, and when "Volume" is indicated in the backup type column 604, this represents that volume backup processing was executed.

Figures 7A, 7B:
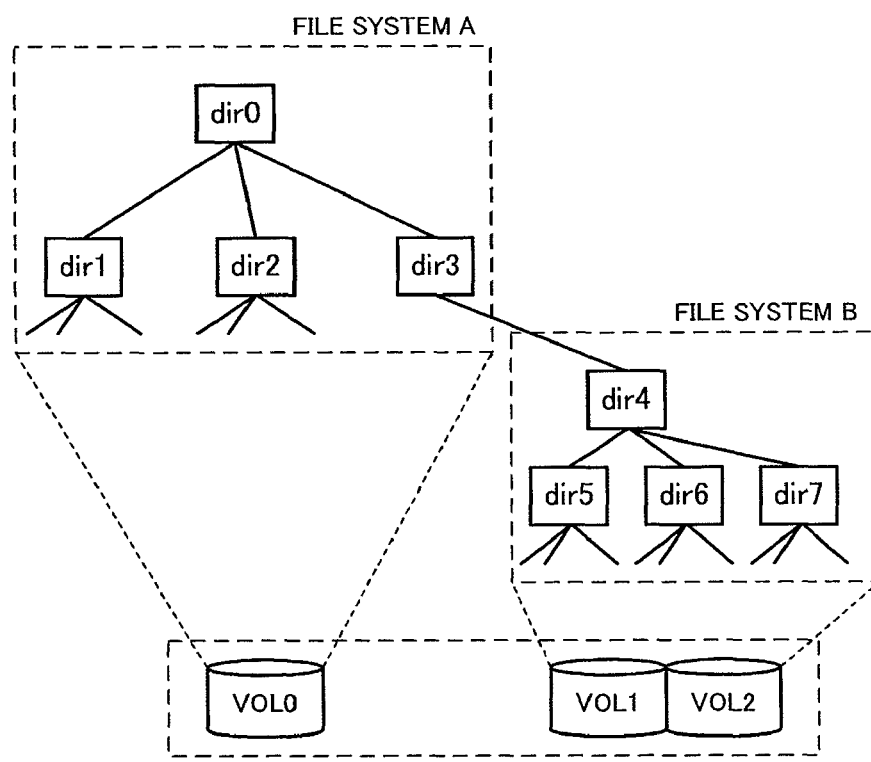
FIG. 7A and FIG. 7B are diagrams explaining the directory-volume correspondence relation according to an embodiment of the present invention.

FIG. 7A and FIG. 7B are diagrams explaining the directory-volume correspondence relation according to an embodiment of the present invention. Specifically, FIG. 7A shows an example of directory-volume mapping information 700, and FIG. 7B schematically shows the directory-volume correspondence relation configured according to the directory-volume mapping information 700.

Specifically, as shown in FIG. 7A, the directory-volume mapping information 700 includes a directory column 701 and a volume column 702, and the respective directories in the file system of the NAS device 11 are thereby associated with the volume storing such directories.

The directory column 701 shows the directory path of the foregoing directories. Further, the volume column 702 shows the volume name (device file name) of the volume storing the directories. In this example, the directories "/dir0/dir3/dir4" are associated with the volumes "VOL1" and "VOL2."

Accordingly, the directory-volume correspondence relation according to the directory-volume mapping information 700 will be as shown in FIG. 7B.

Figure 8:
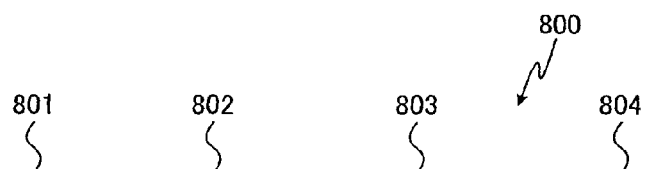
FIG. 8 is a diagram explaining an exemplary volume configuration information according to an embodiment of the present invention.

FIG. 8 is a diagram showing an example of the volume configuration information 800 according to an embodiment of the present invention. The volume configuration information 800 is system information concerning the configuration of the volumes created in the storage subsystem 12. In this embodiment, at the point in time the volumes are created in the storage subsystem 12, the dedicated OS acquires the volume configuration information 800. The volume configuration 800 may be updated based on requests according to the acquired values configuring the volume configuration information 800.

As shown in FIG. 8, the volume configuration information 800 includes a volume name column 801, a total capacity column 802, a utilization column 803, a number of files column 804, and a file capacity column 805.

The volume name column 801 shows the name of the volumes formed in the storage subsystem 12. In this embodiment, the volume name is synonymous with the device file name. The total capacity column 802 shows the total capacity of the disk area providing the volumes. The utilization column 803 is the ratio of usage of files in the volumes in relation to the total capacity of the volumes. The number of files column 804 shows the number of files in the volumes. The file capacity column 805 shows the size of the respective files in the volumes.

FIG. 9 is a diagram explaining an example of the directory configuration information 900 according to an embodiment of the present invention. The directory configuration information is system information concerning the directory configuration of the file system formed in the NAS device 11. In this embodiment, the directory configuration acquisition program is invoked as a result of being called from another program, refers to the volume configuration information 700, and creates the directory configuration information 900 as illustrated in FIG. 9. The directory configuration information 900 may be created in advance and stored in the memory 1227, or updated based on requests according to the acquired values configuring the directory configuration information 900.

Specifically, as shown in FIG. 9, the directory configuration information 900 includes a directory path column 901, a hierarchy column 902, a number of file systems column 903, a utilization column 904, a lower directory status column 905, and a number of files column 906.

The directory path column 901 shows the directory path of all directories configuring the file system in the NAS device 11.

The hierarchy column 902 shows the hierarchy level in the file system of the directories. For example, "1" is assigned if a certain directory is the highest-level directory in the file system to which it belongs, and "2" is assigned if it is a lower directory.

The number of file systems column 903 shows the number of file system configured in the volume storing the directories. In this example, the number of file systems configured in the volume storing the directories "/mnt/dir1/dir3" is shown as "2."

The utilization column 904 shows the ratio of storage capacity used by the directories and its lower directory (i.e., sub directory) existing in the volume in relation to the capacity of the overall volume storing the directories. In other words, this means that the higher the utilization of a certain directory, higher the ratio of the directories in the volume.

The lower directory status column 905 shows whether there is a lower directory in the directories. The number of files column 906 shows the number of files existing in the directories and its lower directories in the volume storing the directories.

Figure 10:
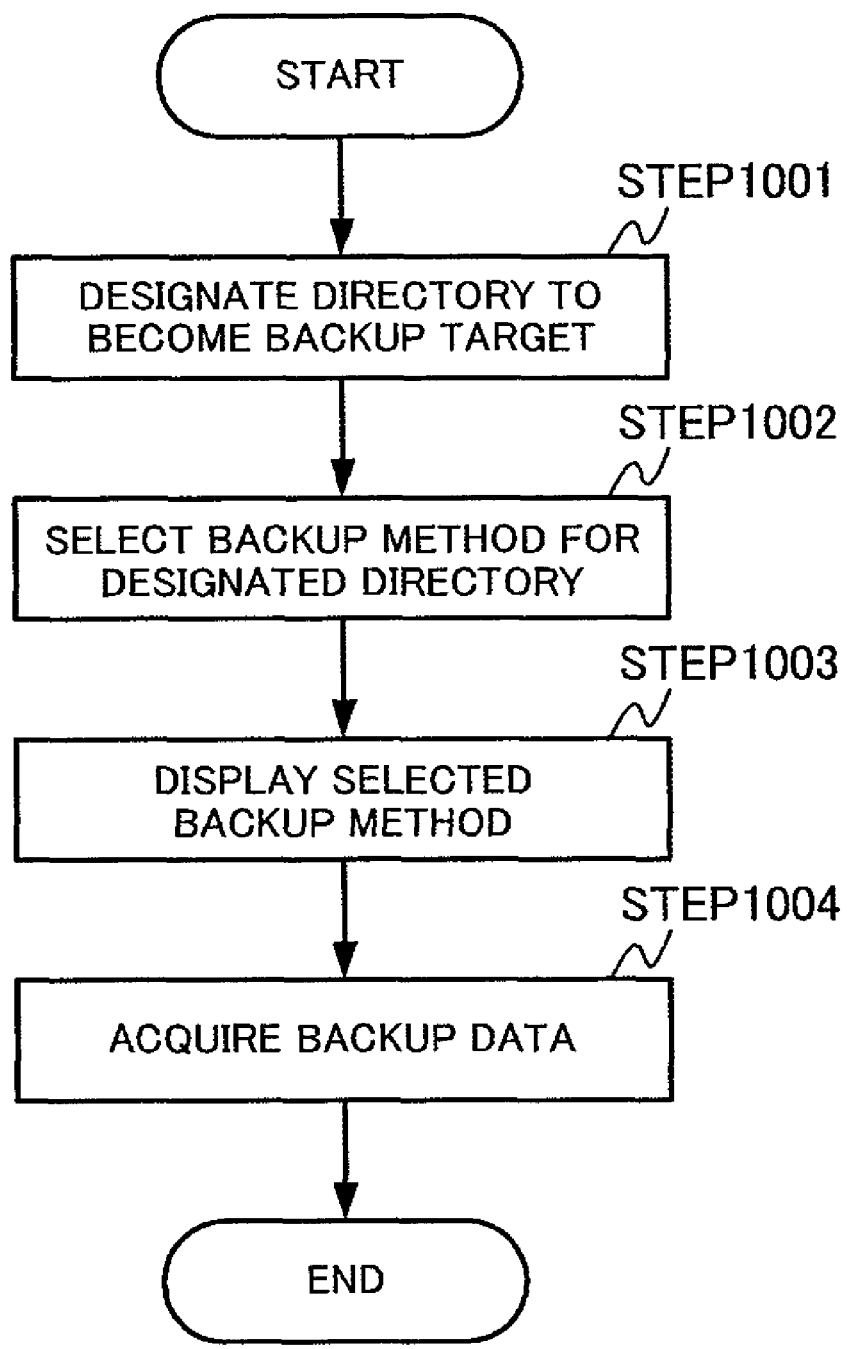
FIG. 10 is a schematic flowchart explaining backup processing in a storage system according to an embodiment of the present invention.

FIG. 10 is a schematic flowchart explaining the backup processing in the storage system 10 according to an embodiment of the present invention.

First, the system administrator operates the management apparatus 13 to boot the backup manager, and then selects the backup processing from the menu. Thereby, the backup manager sends a directory configuration information acquisition request to the NAS device 11. The backup manager acquires directory configuration information from the NAS device 11, presents the initial screen of the backup wizard screen to the system administrator, and selectively receives the designation of a directory as the backup target (STEP 1001).

When the backup manager receives the designation of the directory from the system administrator, it subsequently sends a backup method selection request of the directory to the NAS device 11. The NAS device 11 receives this request and selects the optimal backup method of the designated directory (STEP 1002).

Subsequently, the NAS device 11 sends the selected backup method to the management apparatus 13. Upon receiving the selected backup method, the management apparatus presents the subsequent screen, and receives the backup processing based on the selected backup method to be executed to the directory to become the backup target (STEP 1003).

When the NAS device 11 receives the execution of backup processing, it executes the backup processing to the directory to become the backup target according to the selected backup method, and acquires the backup data (STEP 1004). When the NAS device 11 acquires the backup data, it creates and updates the backup history information 600.

Instead of causing the system administrator operating the management apparatus 13 to confirm the selected backup method, the NAS device 11 may also continue to execute the backup processing after selecting the optimal backup method. In this case, preferably, the NAS device 11 sends the backup data acquisition status to the management apparatus 13, and the management apparatus 13 presents such acquisition status.

Further, when the management apparatus 13 is to execute periodical automatic backup processing, the management apparatus 13 presents the selected backup method to the system administrator ex post factor as a backup report. The system administrator will be able to decide the backup schedule by referring to the backup report.

Figure 11A:
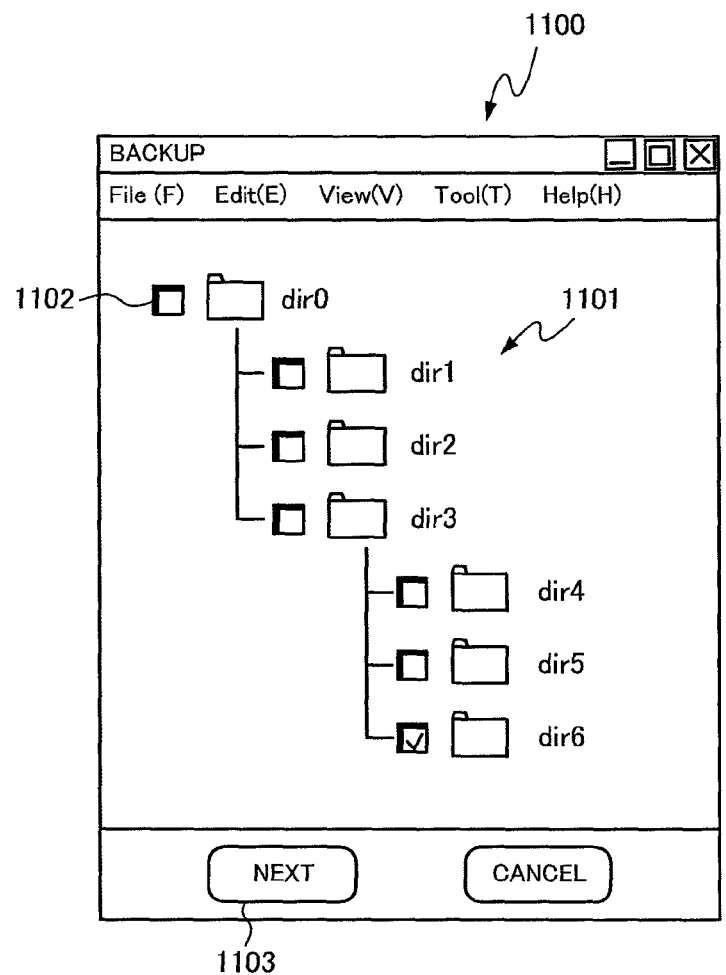
FIG. 11A and FIG. 11B are diagrams explaining an example of a backup wizard screen according to an embodiment of the present invention.
Figure 11B:
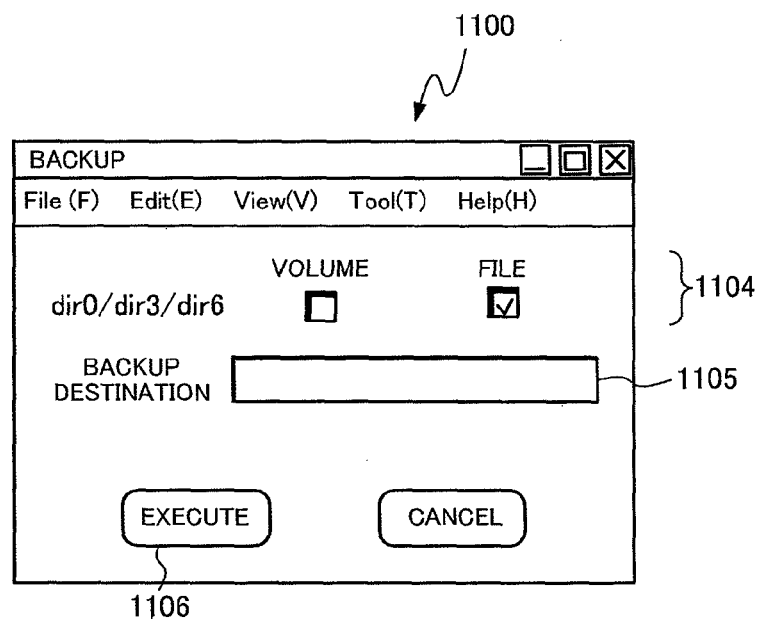

FIG. 11A and FIG. 11B are diagrams explaining an example of the backup wizard screen 1100 according to an embodiment of the present invention. The backup wizard screen 1100 of this embodiment includes a backup target selection screen (FIG. 11A) and a backup execution screen (FIG. 11B). The backup wizard screen 1100 is provided to the system administrator by the backup manager in the management apparatus 13. The system administrator can command the execution of backup processing after interactively and selectively designates a directory to become the backup target according to the backup wizard screen 1100, and confirming the selected and presented volume method.

Specifically, as shown in FIG. 11A, the backup target selection screen 1100 includes a hierarchical display 1101 of a directory structure of the file system provided by the NAS device 11. A check box 1102 is provided to each directory, and the system administrator is able to check the directory to be backed up. In this example, the directory "/dir3/dir6" is selected as the backup target.

As a result of the system administrator selectively designating the directory to become the backup target and thereafter selecting the "Next" button 1103, the backup manager sends a backup request containing the designated directory to the NAS device 11. When the NAS device 11 receives this request, it selects the optimal backup method of the designated directory, and sends this to the management apparatus 13.

The management apparatus 13 displays the backup execution screen 1100 based on the selected backup method sent from the NAS device 11. Namely, as shown in FIG. 11B, the backup execution screen 1100 includes a display 1104 of the selected backup method of the designated directory. In this example, the file backup method is selected for the designated "/dir3/dir6." The system administrator may directly receive the backup method selected by the NAS device 11, or reselect an alternative backup method.

The system administrator inputs the backup destination of the directory that is a backup target into the backup destination field 1105 on the backup execution screen, and selects the "Execute" button. By way of this, the backup manager sends a backup execution request to the NAS device 11 so as to acquire the backup data under the designated condition.

Figure 12:
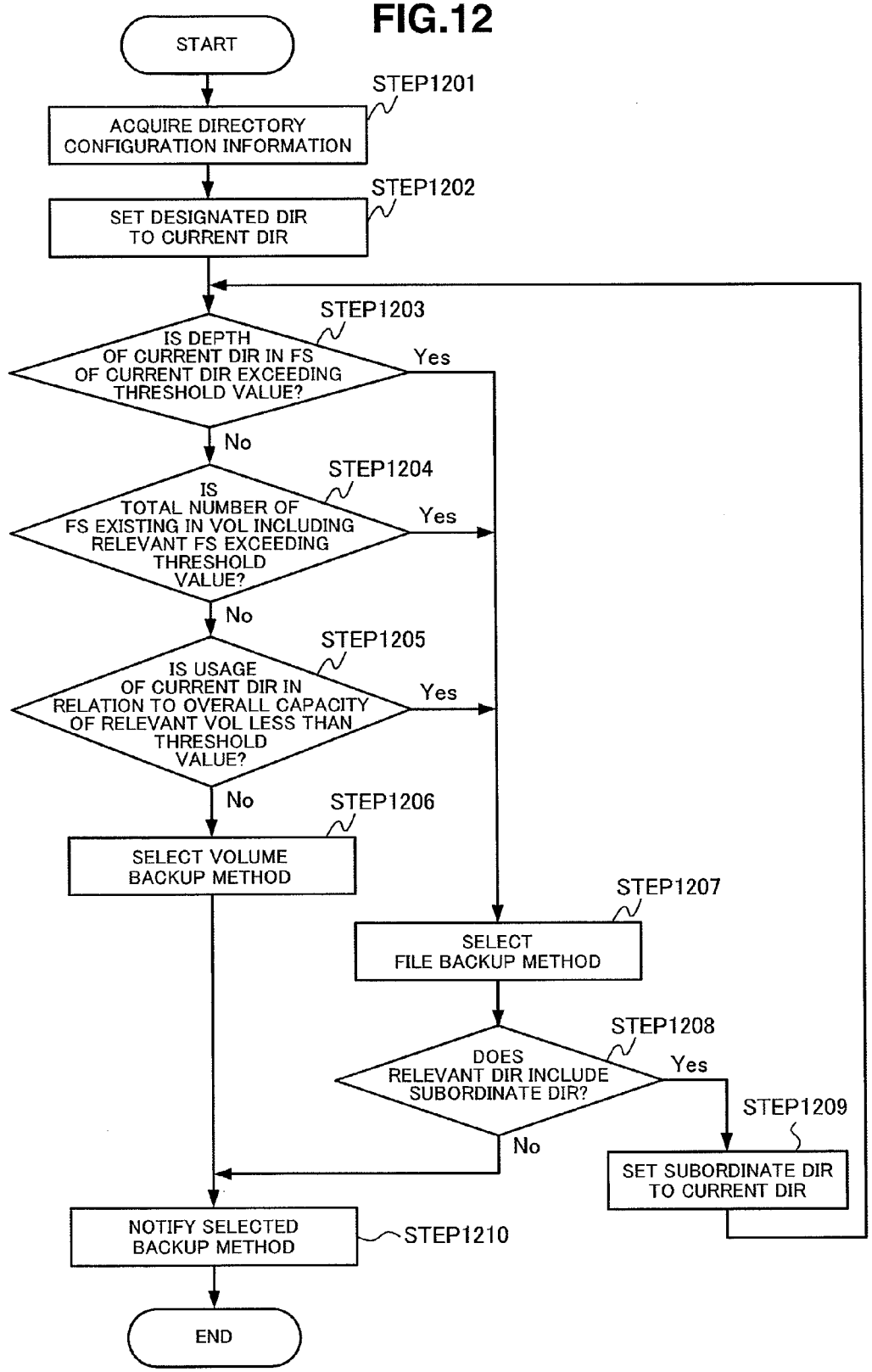
FIG. 12 is a diagram explaining backup method selection processing in a NAS device according to an embodiment of the present invention.

FIG. 12 is a diagram explaining the backup method selection processing in the NAS device 11 according to an embodiment of the present invention. The NAS device 11 performs the backup method selection processing by executing the backup selection program under the control of the processor 112.

As shown in FIG. 12, foremost, when the NAS device 11 receives a directory configuration information acquisition request from the management apparatus 13, it calls the directory configuration information acquisition program, and acquires the directory structure information 900 (STEP 1201).

Subsequently, the NAS device 11 sends the acquired directory structure information 900 to the management apparatus 13. The system administrator operating the management apparatus 13, as described above, selectively designates the directory to become the backup target from the directory structure created based on the acquired directory configuration information 900. The management apparatus 13 sends a backup method selection request of the designated directory to the NAS device 11.

When the NAS device 11 receives the backup method selection request, it sets the designated directory to the current directory so as to perform the following processing based on the acquired directory structure information 900 (STEP 1202). Namely, the current directory is a directory that is being noted by the backup selection program.

More specifically, the NAS device 11 determines whether the depth of the current directory in the file system to which the current directory belongs is exceeding a prescribed threshold value (STEP 1203). In this example, the prescribed threshold value, for example, is set to "1." To put it differently, it is determined here whether the current directory is a highest-level directory in the file system.

When it is determined that depth of the current directory is not exceeding the prescribed threshold value (STEP 1203; No), the NAS device 11 subsequently determines whether the total number of file systems existing in the volume containing the file system is exceeding a prescribed threshold value (STEP 1204). In this example, the prescribed threshold value, for example, is set to "1." To put it differently, it is determined here whether the volume containing the file system contains a plurality of file systems.

When it is determined that the total number of file systems existing in the volume is not exceeding the prescribed threshold value, the NAS device 11 additionally determines whether the usage of the current directory in relation to the overall capacity of the volume falls below a prescribed threshold value (STEP 1205). In this example, the prescribed threshold value, for example, is set to 80%. To put it differently, it is determined whether the current directory is comparatively using a lot of storage capacity in the volume.

When the usage of the current directory in relation to the overall capacity of the volume does not fall below a prescribed threshold value (STEP 1205; No), the NAS device 11 selects the volume backup method regarding the current directory (STEP 1206). The NAS device 11 thereafter notifies the backup method selected for the current directory (in other words, the volume backup method) to the management apparatus 13 (STEP 1210). The management apparatus 13 receives this notice, and confirms with the system administrator on whether to back up the designated directory based on the volume backup method.

In contrast, when the determination is 'Yes' at any one of STEPS 1203 to 1205, the NAS device 11 selects the file backup method regarding the current directory (STEP 1207). The NAS device 11 further determines whether the current directory has a lower directory (STEP 1208). When it is determine that the current directory does not have a lower directory, the NAS device 11 notifies the backup method selected for the current directory (i.e., the file backup method) to the management apparatus 13 (STEP 1210).

Contrarily, when it is determined that the current directory has a lower directory, the NAS device 11 sets the lower directory to the current directory (STEP 1209), and returns to the processing at STEP 1203. This is in light of the fact that there are cases where the lower directory belongs to the highest-level directory of a separate file system, and such separate file system accounts for the overall volume. By way of this, it is possible to select the file backup method for the designated higher-level directory, and select the volume backup method for the lower directory. Accordingly, it is possible to select the backup method in detail according to the directory configuration information, and further improve the backup efficiency.

With the foregoing backup selection processing, although the backup method is selected using the combination of the three conditions illustrated in the processing of STEPS 1203 to 1205, the present invention is not limited thereto, and the backup method may also be selected by using any one of the conditions or an arbitrary combination of two or more conditions.

For example, in the file system having the directory structure shown in FIG. 7B, let it be assumed that the system administrator just designated "dir3" as the backup target directory.

In such a case, the file backup method will be selected for the hierarchy level itself of the directory "dir3" (STEP 1203; Yes). Since the directory "dir3" has a lower directory "dir4," the optimal file backup method is determined for the directory "dir4," and the volume backup method is selected thereby. In other words, directory "dir4" or lower will be subject to the volume backup processing to the volumes VOL1 and VOL2 forming the file system B.

Figure 13:
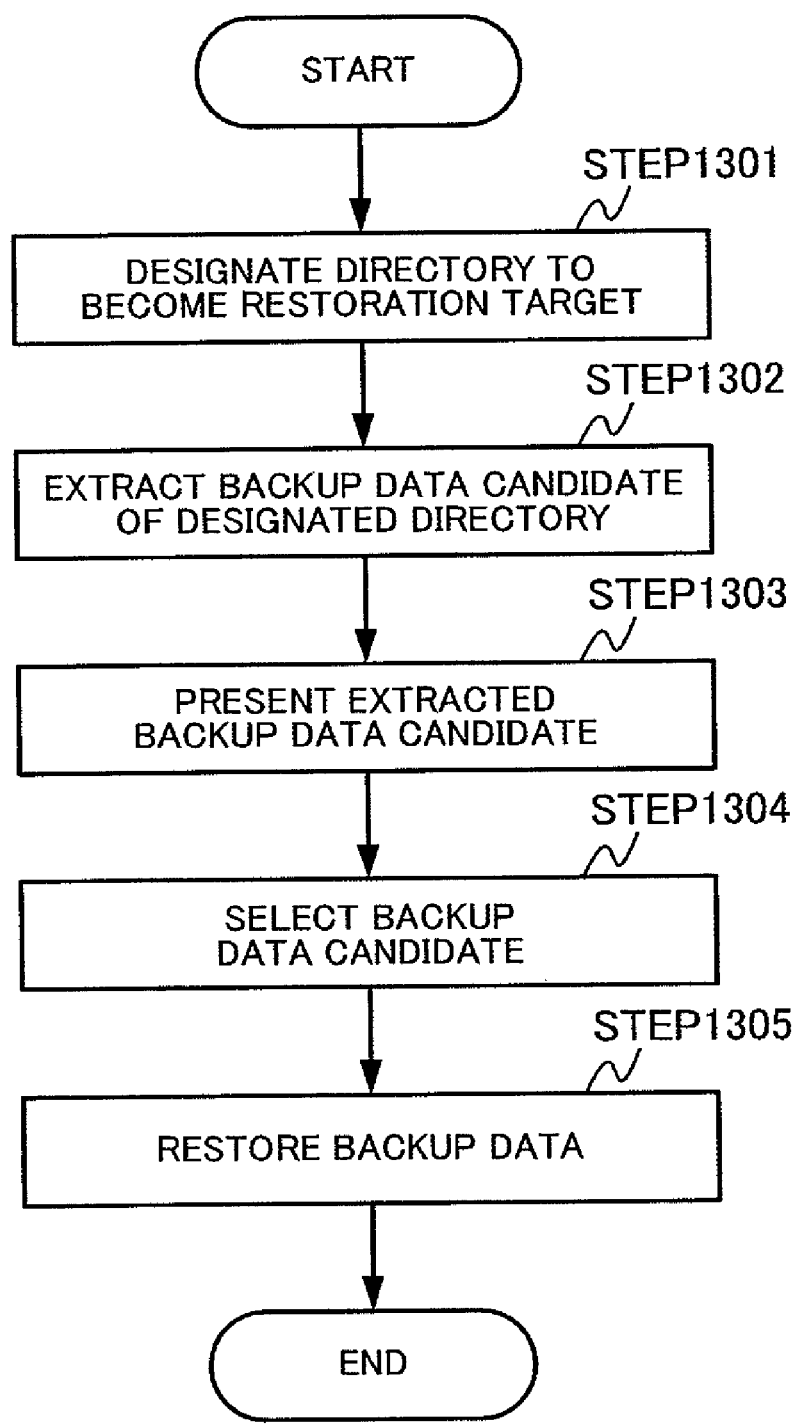
FIG. 13 is a schematic flowchart explaining restoration processing in a storage system according to an embodiment of the present invention.

FIG. 13 is a schematic flowchart explaining the restoration processing in the storage system 10 according to an embodiment of the present invention.

First, the system administrator operates the management apparatus 13 to boot the backup manager, and then selects the restoration processing from the menu. The backup manager presents the initial screen of the restoration wizard screen 1400 described later to the system administrator, and receives the designation of the directory to become the restoration target (STEP 1301). The backup manager acquires the backup history 600 and the directory configuration information 900 from the NAS device 11 for creating this kind of restoration wizard screen 1400.

When the backup manager receives the designation of the directory to become the restoration target from the system administrator, it sends a backup data candidate request of that directory to the NAS device 11. Upon receiving this request, the NAS device 11 refers to the backup history 600, creates list of the backup data acquired from the backup processing performed to the designated directory, and sends this list to the management apparatus 13 (STEP 1302). Namely, when the directory is periodically backed up, since a plurality of backup data will exist in the directory, the NAS device 11 creates a list of such backup data and presents this list to the system administrator (STEP 1303).

The system administrator selects one backup data to be restored from the presented backup data candidate list (STEP 1304). The management apparatus 13 sends a restoration execution request based on the selected backup data to the NAS device 11.

When the NAS device receives the restoration execution request, it executes restoration processing based on the backup data according to the restoration execution request (STEP 1305).

Incidentally, when the backup data according to the restoration execution request is based on the volume backup method, the volume restoration support processing described later will be performed.

Figure 14A:
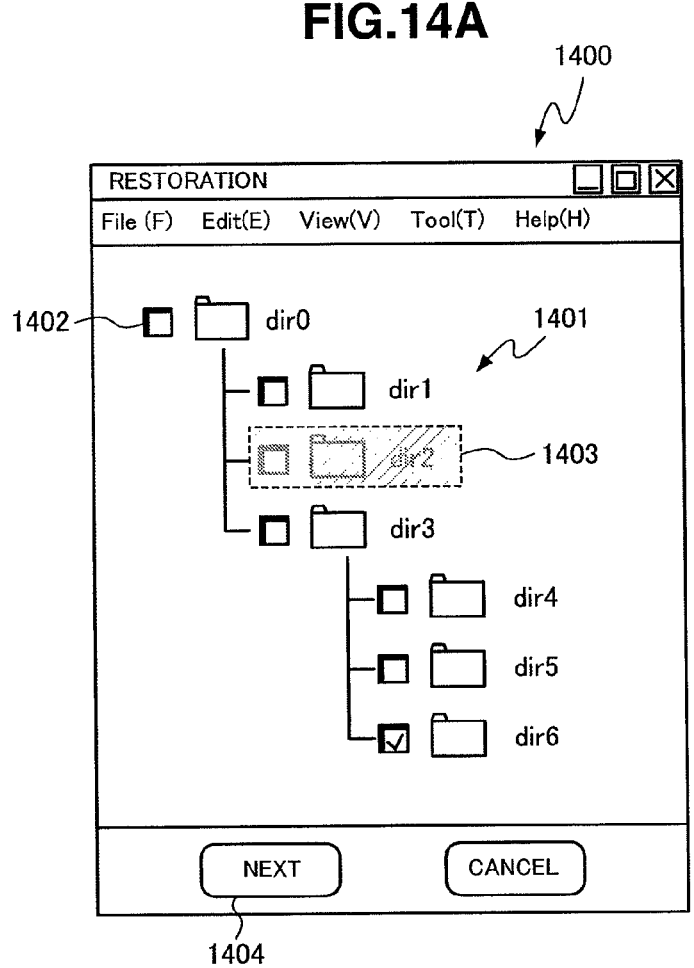
FIG. 14A and FIG. 14B are diagrams explaining an exemplary a restoration wizard screen according to an embodiment of the present invention.
Figure 14B:
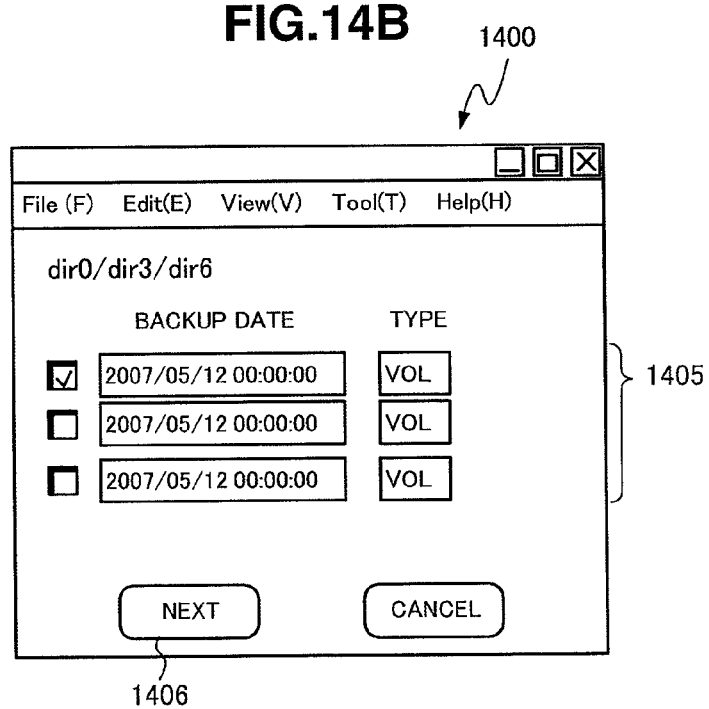

FIG. 14A and FIG. 14B are diagrams explaining an example of the restoration wizard screen 1400 according to an embodiment of the present invention. The backup wizard screen 1400 of this embodiment includes a restoration target selection screen (FIG. 14A) and a restoration execution screen (FIG. 14B). The restoration wizard screen 1400 is presented to the system administrator by the backup manager in the management apparatus 13. The system administrator can command the execution of restoration after interactively selecting the directory to be restored using the restoration wizard screen 1400 and confirming the backup data of the directory.

Specifically, as shown in FIG. 14A, the restoration target selection screen includes a hierarchical display 1401 of a directory structure of the file system provided by the NAS device 11. A check box 1402 is provided to each directory, and the system administrator is able to check the directory to be restored. In this example, "/dir3/dir6" is selected as the backup target. Further, a directory without any backup data and which cannot be restored, as shown with reference numeral 1403, is displayed inactively. In this example, "dir2" is displayed inactively, and cannot be selected.

As a result of the system administrator designating the directory to become the restoration target and thereafter selecting the "Next" button 1404, the backup manager sends a backup request candidate request containing the designated directory to the NAS device 11. When the NAS device 11 receives this request, it extracts the candidate of backup data of the designated directory, and sends this to the management apparatus 13. Backup data, for instance, is extracted for each date backup was executed to the directory.

The management apparatus 13 displays a restoration execution screen based on the candidate of the extracted backup data sent from the NAS device 11. In other words, in FIG. 14B, the restoration execution screen includes a display 1405 of the backup data candidate list of the designated directory. The system administrator selects one backup data of a certain point in time to be restored in the restoration execution screen. In this example, restoration of backup data at "2007/05/1200:00:00" is selected regarding the designated "/dir3/dir6." In this case, the backup manager may also select the backup data acquired by the most recent backup processing as a default.

The system administrator selects and confirms backup data regarding the directory that is the restoration target, and selects the "Execute" button 1406 in the restoration execution screen. Thereby, the backup manager sends a restoration execution request to the NAS device 11 so as to perform restoration based on the selected backup data.

Figure 15:
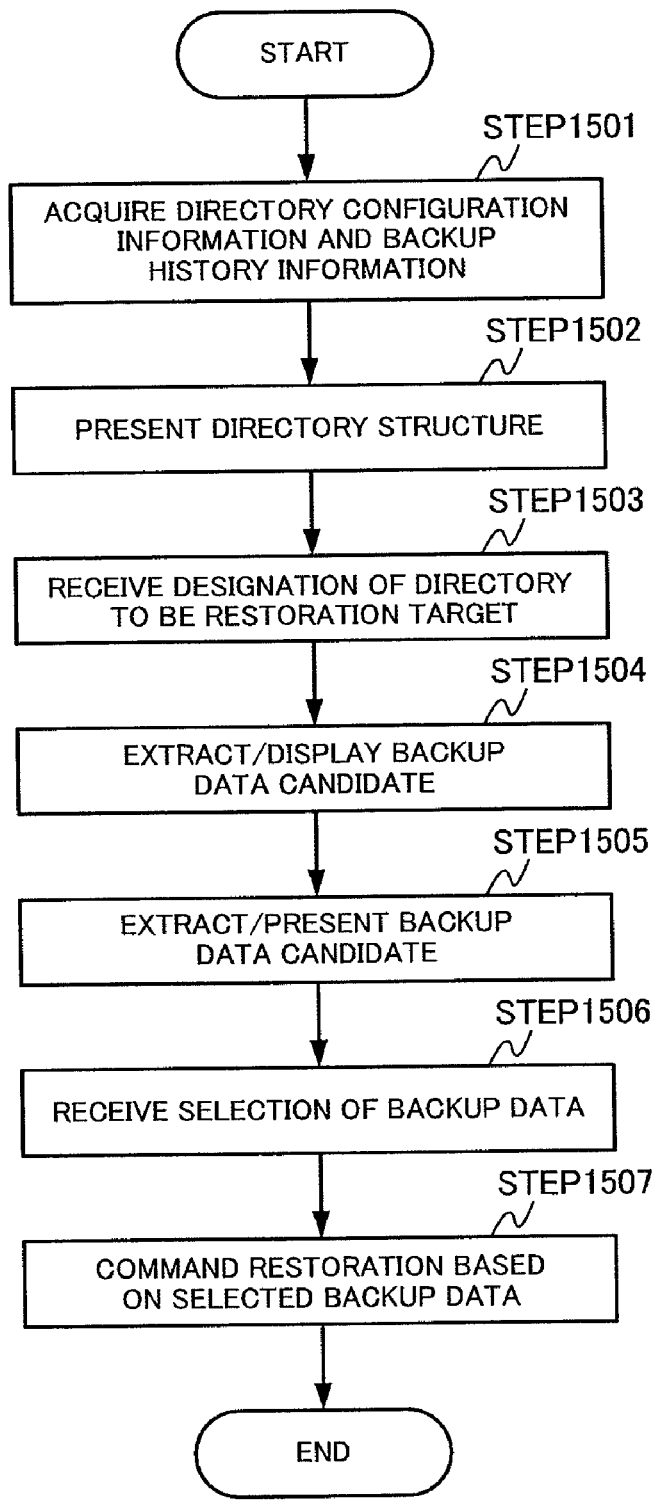
FIG. 15 is a flowchart explaining restoration data selection processing in a management apparatus according to an embodiment of the present invention.

FIG. 15 is a flowchart explaining the restoration data selection processing in the management apparatus 13 according to an embodiment of the present invention.

First, the system administrator operates the management apparatus 13 to boot the backup manager, and then selects restoration processing. The management apparatus 13 executes a restoration selection program, requests the backup history information 600 and the directory configuration information 900 to the NAS device 11, and acquires such information from the NAS device 11 (STEP 1501).

Subsequently, the management apparatus 13 presents the directory structure hierarchically based on the acquired backup history information 600 and the directory configuration information 900, and receives the designation of the directory to become the restoration target from the system administrator (STEP 1502). Here, a directory without any backup history is displayed inactively so that it cannot be selected by the system administrator.

When the management apparatus 13 receives the designation of the directory to become the restoration target (STEP 1503), it refers to the backup history information 600, and extracts the candidate of backup data executed to the designated directory (STEP 1504). The management apparatus 13 thereafter presents a list of the extracted backup data (STEP 1505). The system administrator selects one backup data at the point in time it is to be restored from the presented backup data candidate.

When the management apparatus 13 receives the selection of backup data (STEP 1506), it sends the restoration execution request based on the selected backup data to the NAS device 11 (STEP 1507). Upon receiving this request, the NAS device 11 executes restoration processing and acquires the backup data.

Figure 16:
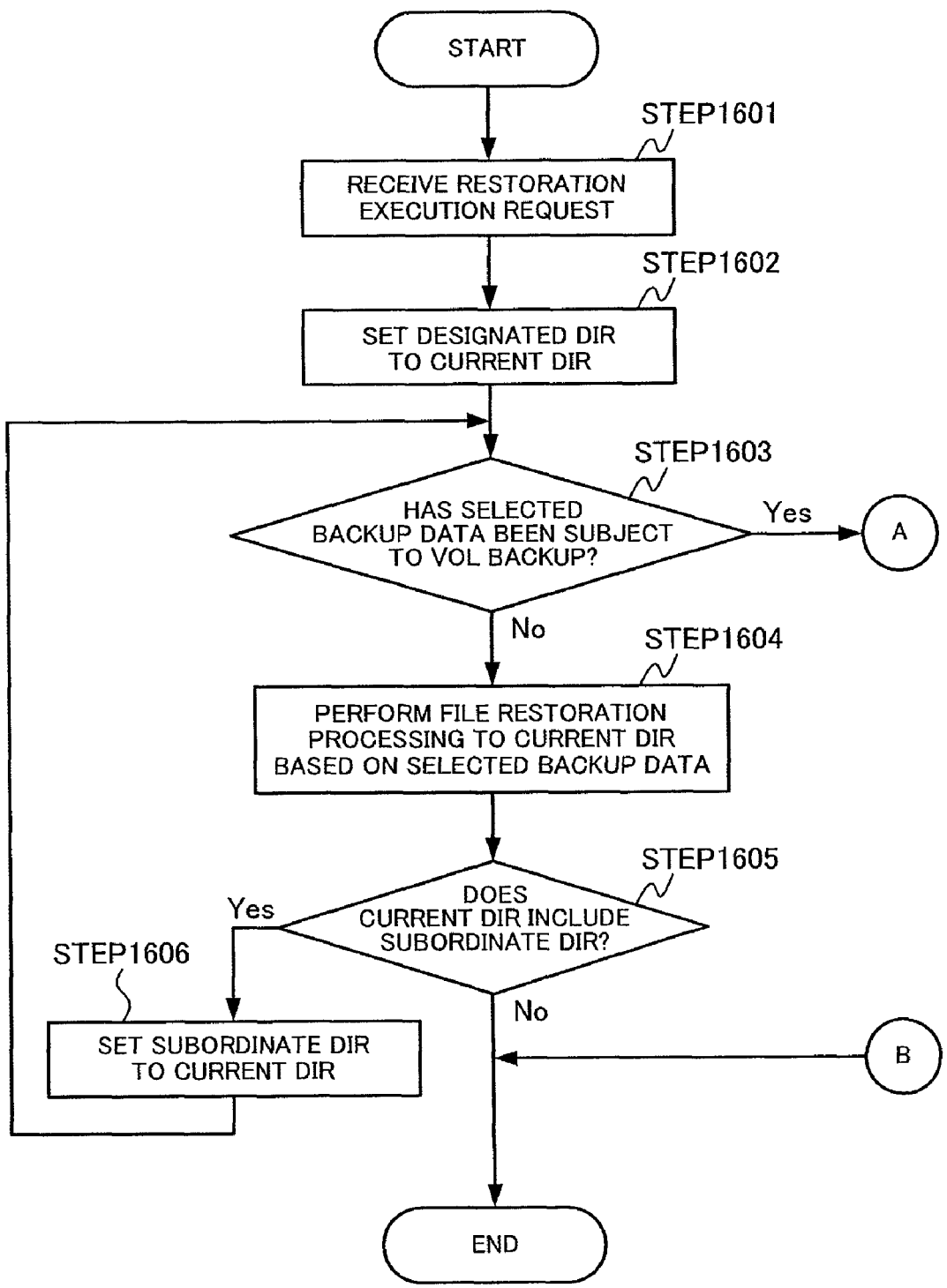
FIG. 16 is a flowchart explaining restoration processing in a NAS device according to an embodiment of the present invention.

FIG. 16 is a flowchart explaining the restoration processing in the NAS device 11 according to an embodiment of the present invention.

As shown in FIG. 16, when the NAS device 11 receives the restoration execution request based on the backup data selected regarding the directory to become the restoration target designated by the system administrator (STEP 1601), it sets the designated directory to the current directory (STEP 1602). Namely, the current directory is a directory that is being noted by the restoration processing program.

The NAS device 11 thereafter refers to the backup history information 600, and determines whether the selected backup data is backup data acquired by executing the volume backup processing (STEP 1603). When the selected backup data is backup data acquired by executing the volume backup processing (STEP 1603; Yes), as described above, the NAS device 11 calls the volume restoration support processing program and executes the requested restoration processing.

Contrarily, when the selected volume backup processing is backup data acquired by executing the volume backup processing (STEP 1603; No), the NAS device 11 executes file restoration processing to the current directory based on the selected backup data (STEP 1604).

When the NAS device 11 completes the file restoration processing to the current directory, it determines whether the current directory has a lower directory (STEP 1605). When the current directory does not have a lower directory (STEP 1605; No), the NAS device 11 ends the restoration processing. Contrarily, when the current directory has a lower directory (STEP 1605; Yes), the NAS device 11 sets the lower directory to the new current directory (STEP 1606), returns to the processing at STEP 1603, and similarly executes restoration processing regarding the new current directory.

Figure 17:
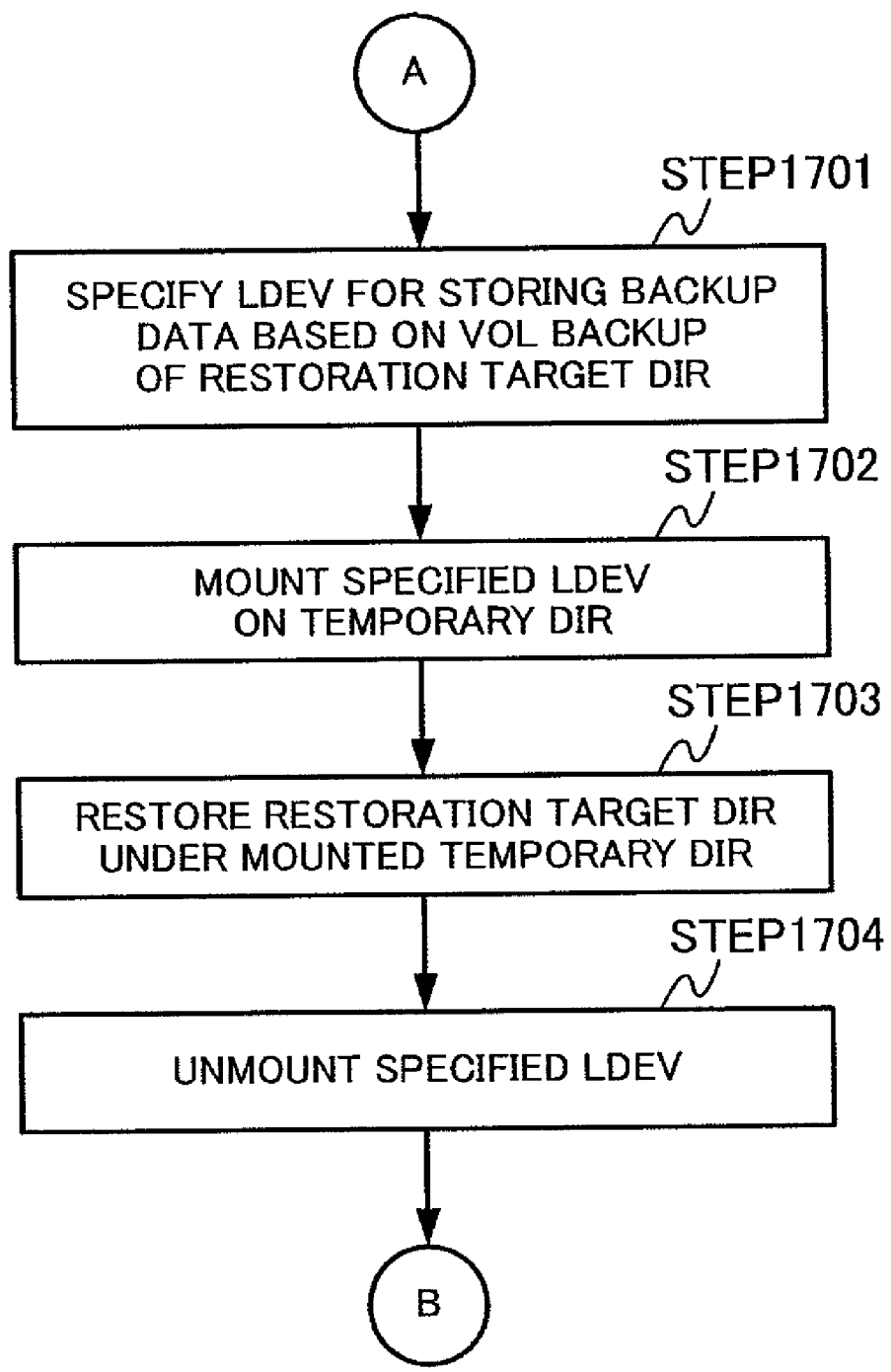
FIG. 17 is a flowchart explaining restoration processing in a NAS device according to an embodiment of the present invention.

FIG. 17 is a flowchart explaining the restoration processing in the NAS device 11 according to an embodiment of the present invention, and more specifically is a flowchart explaining the volume restoration support processing.

Specifically, when it is determined that the backup data acquired at STEP 1603 of FIG. 16 is backup data acquired by executing the volume backup processing (STEP 1603; Yes), the NAS device 11 specifies the logical device including the volume storing the backup data acquired based on the volume backup processing being performed to the directory as the restoration target (STEP 1701). Here, let it be assumed that one volume corresponds to one logical device.

Subsequently, the NAS device 11 mounts the specified logical device on a temporary directory "rst_tmp" for restoration (STEP 1702). The NAS device 11 thereafter performs file restoration processing to the directory as the restoration target under the mounted temporary directory "rst_tmp" (STEP 1703).

When the NAS device 11 ends the file restoration processing regarding the target directory, it performs unmounting in order to separate the logical device from the file system (STEP 1704).

Thereby, even when the file backup processing is executed regarding a specified directory in the individual file systems, the NAS device 11 is able to reliably perform restoration.

For example, in a file system having the directory structure shown in FIG. 7B, assumed that the backup processing was performed to the directory "dir4" and backup data was acquired. Further, assumed that the system administrator designated the directory "dir7" as the restoration target.

Figure 18:
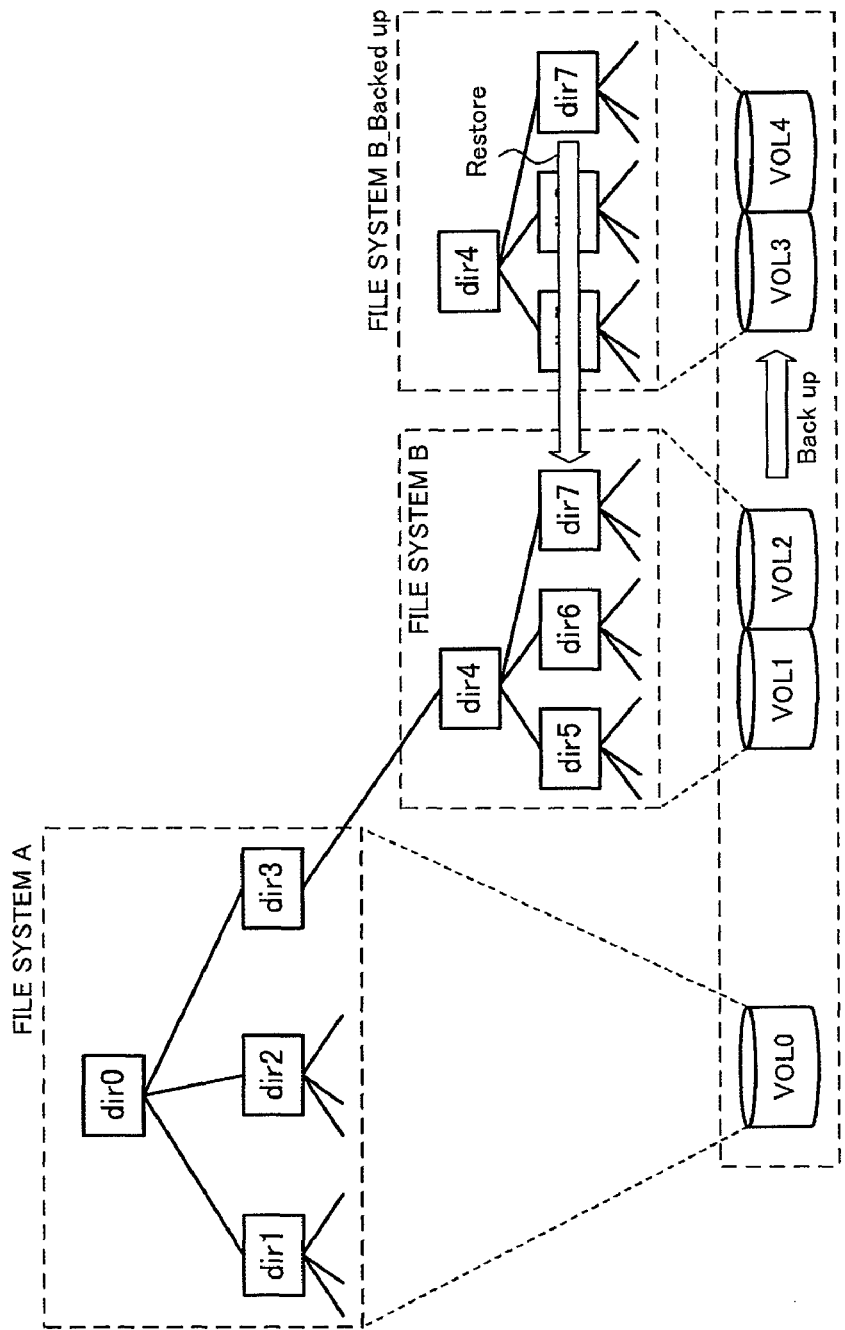
FIG. 18 is a conceptual diagram explaining restoration processing in a NAS device according to an embodiment of the present invention.

In this case, as shown in FIG. 18, the directory "dir4" has been subject to volume backup processing. Accordingly, in order to restore the directory "dir7," the volumes VOL3 and VOL4 as the backup data acquired based on volume backup processing are specified, and the file system B_Backed up formed from the foregoing volumes is temporarily mounted. Then, restoration processing is performed by copying the contents of the directory "dir7" in the file system B_Backed up to the file system B.

In the foregoing example, although a case was explained of restoring a specified directory subject to volume backup, when restoring the overall volume that was subject to a volume backup, the system administrator may command the execution of the volume restoration processing to the storage subsystem 12 via the backup manager.

Figure 19:
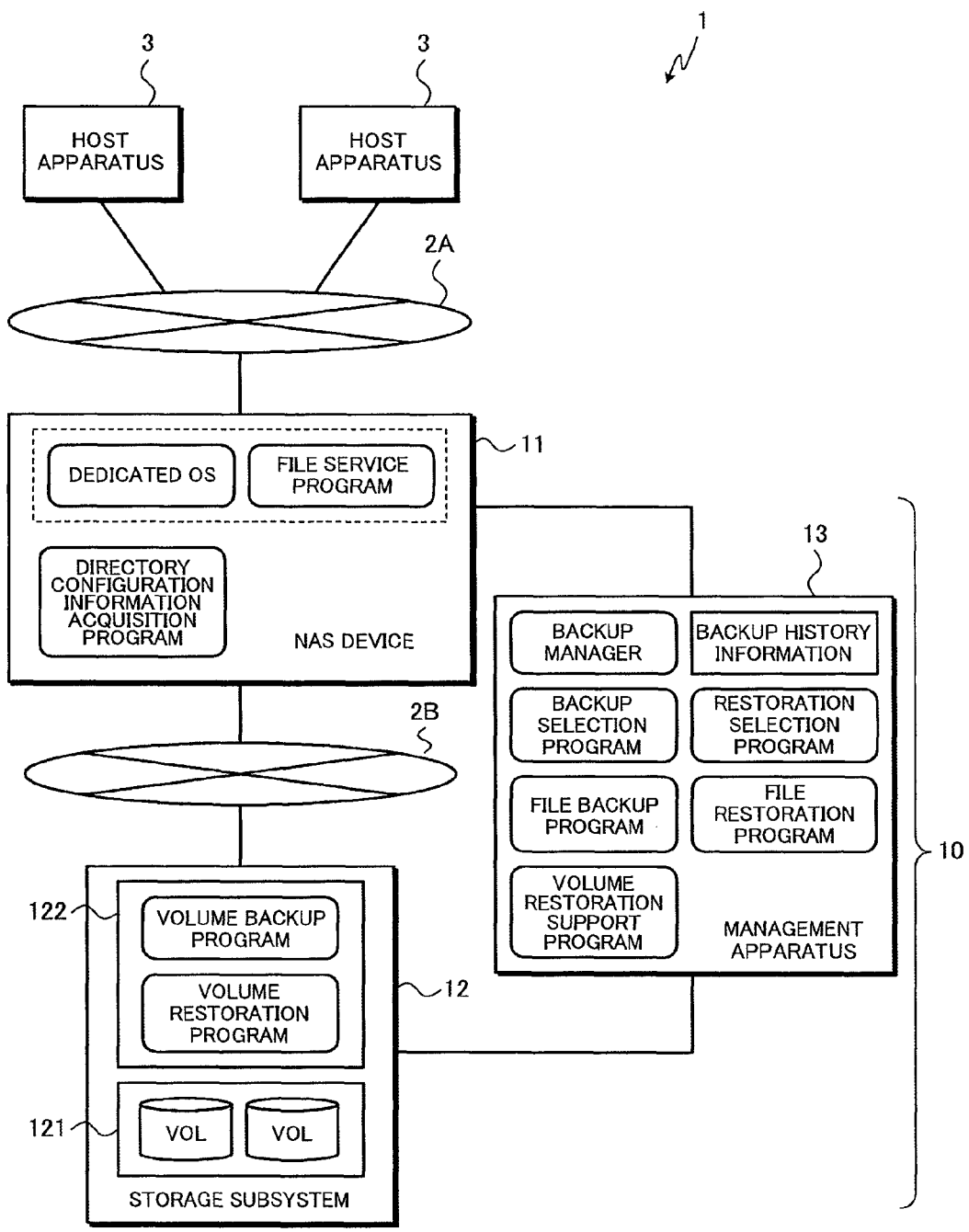
FIG. 19 is a diagram explaining a modified example of a storage system according to an embodiment of the present invention.

A modified example of this embodiment is now explained. With the modified example of this embodiment, the management apparatus 13 is mounted with the backup selection function instead of the NAS device 11. The management apparatus 13 is also mounted with the file backup/restoration function. FIG. 19 is a diagram explaining a modified example of the storage system according to an embodiment of the present invention.

As shown in FIG. 19, the management apparatus 13 further includes, in addition to the backup manager, a backup/restoration selection program, a file backup/restoration program, and a volume support program. Further, the NAS device 11 includes a directory configuration information acquisition program, and sends the directory configuration information 900 to the management apparatus 13 according to a request from the backup selection program.

The backup selection program of the management apparatus 13 selects the optimal backup method based on the sent directory configuration information 900, and presents this to the user. When the management apparatus 13 selects the file backup method, it boots the file backup program and executes file backup processing. Further, when the management apparatus 13 selects the volume backup method, it commands the storage subsystem 12 to execute volume backup.

The hardware configuration and the processing contents of the respective programs of the storage system 10 are the same as the foregoing embodiment, and the explanation thereof is omitted.

Another embodiment of the present invention is now explained. FIG. 20 is a diagram showing the configuration of a computer system according to another embodiment of the present invention. In this embodiment, a storage system utilizing GNS (Global Name Space) technology is configured.

Specifically, as shown in FIG. 20, the computer system 1 of this embodiment further includes a GNS server 14 connected to the network 2A. The NAS device 11, the storage subsystem 12, and the GNS server 14 are connected to the management apparatus 13 via the network 2A.

GNS is technology of transparently changing the arrangement of the shared directory between the file servers (in other words, the NAS devices 11) connected to a single network from a client computer (in other words, the host apparatus 3). As a result of using this kind of GNS technology, it is possible to change the arrangement of the directory and balance the load according to the access load in the file server, and the cost performance of the overall storage system can be improved thereby.

More specifically, with GNS, the logical address of the shared directory designated by the client computer is converted into a physical address of the file server in which the directory is actually arranged. Thereby, even if the physical location of the shared directory is changed, the client computer is able to access the shared directory using the same logical address.

Referring to FIG. 20, the GNS server 14 is a server computer that performs address conversion of directories provided by the individual NAS devices 11 connected to the same network 2A. In other words, the GNS server 14 is uniformly managing the logical/physical address of the NAS device 11 on the network 2. Accordingly, the host apparatus 3 of this embodiment does not directly access the directories provided by the NAS device 11, but rather once requests the GNS server 14 the conversion of the logical address of the directory, and accesses the NAS device 11 according to the physical address replied from the GNS server 14. The GNS server 14 realizes the foregoing function by executing the GNS service program under the control of the CPU not shown.

The GNS server 14 of this embodiment is also mounted with the foregoing backup selection program, restoration selection program, and volume restoration support program. The GNS server 14 executes the backup selection program based on the command from the backup manager of the management apparatus 13. The GNS server 14 acquires the directory configuration information from a specified NAS device 11 including the directory as the backup target, selects the optimal backup method based on the directory configuration information, and sends this to the management apparatus 13. Upon receiving this method, the management apparatus 13 presents the selected backup method to the system administrator. The GNS server 14 requests the NAS device to execute file backup, or requests the storage subsystem to execute volume backup according to the selected backup method.

Thereby, even with a storage system comprising the GNS server 14, the optimal backup method of the directory as the backup target is selected based on the directory configuration information and presented to the system administrator. Accordingly, the system administrator is able to confirm the presented backup method, and more easily manage the system.

Each of the foregoing embodiments is exemplifications for explaining the present invention, and are not intended to limit the scope of the present invention. The present invention may be implemented in various modes so as long as it does not deviate from the gist of this invention.

For instance, as evident from each of the foregoing embodiments, the respective programs that realize the backup/restoration mechanism of the present invention may be mounted on an arbitrary device so as long as the functions of these programs do not depend upon a unique device. Accordingly, for example, in the foregoing embodiment comprising the GNS server 14, although the GNS server 14 is mounted with the backup selection program, such backup selection program may also be mounted on the management apparatus 13.

The present invention may be broadly applied to storage systems using NAS.

What is claimed is:

1. A storage system comprising:
a file server operatively connected to a host apparatus and configured to provide a plurality of directories in at least one file system having a directory structure, to the host apparatus;
a storage subsystem operatively connected to the file server and configured to provide at least one volume for storing the at least one file system; and
a management apparatus operatively connected respectively to the file server and the storage subsystem and configured to manage backup/restoration processing of an arbitrary directory contained in the at least one file system;
wherein the file server includes a backup controller configured to receive a backup method selection request which sets a directory designated as a backup target from the management apparatus,
wherein the file server contains a directory configuration information including:
a first value regarding a hierarchy level of the designated directory in the file system which includes the designated directory;
a second value regarding a number of file systems existing in a volume storing the file system which includes the designated directory; and
a third value regarding a usage ratio of the designated directory in relation to capacity of the volume storing the file system which includes the designated directory;
wherein the backup controller determines whether the hierarchy level of the designated directory is exceeding a first threshold value based on the directory configuration information,
wherein the backup controller determines whether a number of file systems existing in the volume storing the file system which includes the designated directory is exceeding a second threshold value based on the directory configuration information,
wherein the backup controller determines whether the usage ratio of the designated directory is exceeding a third threshold value based on the directory configuration,
wherein the backup controller selects a volume backup method in case that the backup controller determines that the hierarchy level of the designated directory is not exceeding the first threshold value, and a number of file systems existing in the volume storing the file system including the designated directory is not exceeding the second threshold value, and the usage ratio of the designated directory is exceeding the third threshold value,
wherein the backup controller selects a file backup method in case that the backup controller determines that the hierarchy level of the designated directory is exceeding the first threshold value, or a number of file systems existing in the volume storing the file system including the designated directory is exceeding the second threshold value, or the usage ratio of the designated directory is not exceeding the third threshold value, and
wherein the backup controller executes backup processing to the designated directory according to the selected volume backup method or the selected file backup method.

2. The storage system according to claim 1,
wherein the management apparatus provides the selected volume backup method or file backup method to a user.

3. The storage system according to claim 1,
wherein the management apparatus provides the directory structure to a user, and urges the user to designate one or more directories and/or files to be the backup target.

4. The storage system according to claim 1,
wherein the file server executes file backup processing to the designated directory when the file backup method is selected.

5. The storage system according to claim 1,
wherein the storage subsystem executes volume backup processing to the volume storing the file system including the designated directory when the volume backup method is selected.

6. The storage system according to claim 1,
wherein the backup controller creates backup history information based on the execution of the backup processing, and
wherein the backup history information of the designated directory contains the selected volume backup method or the file backup method.

7. The storage system according to claim 6, further comprising a restoration controller configured to control execution of restoration processing to backup data based on the backup processing.

8. The storage system according to claim 7,
wherein the management apparatus provides the directory structure to a user for restoring the backup data based on the backup processing, and prompts the user to designate a directory to be a restoration target that was subject to the backup processing.

9. The storage system according to claim 8,
wherein the management apparatus provides a candidate of the backup data regarding the directory designated as the restoration target to a user, and prompts the user to select backup data regarding the directory designated as the restoration target.

10. The storage system according to claim 7,
wherein the restoration controller selects a restoration method according to the backup history information.

11. The storage system according to claim 10,
wherein, upon executing restoration processing to backup data based on the backup processing according to the selected volume backup method or the selected file backup method, the restoration controller mounts the volume based on the backup processing according to the selected volume backup method or the selected file backup method.

12. The storage system according to claim 11,
wherein the restoration controller executes restoration processing to backup data regarding a directory designated as a restoration target included in a file system stored in the mounted volume.

13. A method of managing data in a storage system which including a file server configured to provide at least one file system having a directory structure in a volume formed in a storage subsystem to a host apparatus, the method comprising:
receiving, under control of a management apparatus, a designation of a directory to be a backup target in the at least one file system;
acquiring, under control of a backup controller, directory configuration information of a file system regarding the designated directory, the directory configuration information including a first value regarding a hierarchy level of the designated directory in the file system including the designated directory, a second value regarding a number of file systems existing in a volume storing the file system including the designated directory, and a third value regarding a usage ratio of the designated directory in relation to capacity of the volume storing the file system including the designated directory;
determining whether the hierarchy level of the designated directory is exceeding a first threshold value based on the directory configuration information;
determining whether a number of file systems existing in the volume storing the file system including the designated directory is exceeding a second threshold value based on the directory configuration information;
determining whether the usage ratio of the designated directory is exceeding a third threshold value based on the directory configuration;
selecting a volume backup method in case that the backup controller determines that the hierarchy level of the designated directory is not exceeding the first threshold value, and a number of file systems existing in the volume storing the file system including the designated directory is not exceeding the second threshold value, and the usage ratio of the designated directory is exceeding the third threshold value,
selecting a file backup method in case that the backup controller determines that the hierarchy level of the designated directory is exceeding the first threshold value, or a number of file systems existing in the volume storing the file system including the designated directory is exceeding the second threshold value, or the usage ratio of the designated directory is not exceeding the third threshold value, and
executing, under control of the backup controller, backup processing to the designated directory according to the selected volume backup method or the selected file backup method.

14. The method according to claim 13, further comprising providing, under control of the management apparatus, the selected volume backup method or the selected file backup method to a user.

* * * * *